(12) United States Patent
Hada et al.

(10) Patent No.: US 9,897,839 B2
(45) Date of Patent: *Feb. 20, 2018

(54) MANUFACTURING METHOD FOR LIQUID CRYSTAL DISPLAY

(71) Applicant: NITTO DENKO CORPORATION, Ibaraki-shi, Osaka (JP)

(72) Inventors: Kazuya Hada, Ibaraki (JP); Seiji Kondo, Ibaraki (JP); Satoshi Hirata, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 482 days.

This patent is subject to a terminal disclaimer.

(21) Appl. No.: 14/373,838

(22) PCT Filed: Mar. 14, 2013

(86) PCT No.: PCT/JP2013/057190
§ 371 (c)(1),
(2) Date: Jul. 22, 2014

(87) PCT Pub. No.: WO2013/137390
PCT Pub. Date: Sep. 19, 2013

(65) Prior Publication Data
US 2015/0027626 A1 Jan. 29, 2015

(30) Foreign Application Priority Data

Mar. 14, 2012 (JP) .................................. 2012-057936

(51) Int. Cl.
B32B 38/04 (2006.01)
B32B 37/22 (2006.01)
(Continued)

(52) U.S. Cl.
CPC ........ *G02F 1/133351* (2013.01); *B29C 65/72* (2013.01); *B29D 11/0073* (2013.01);
(Continued)

(58) Field of Classification Search
CPC .......... G02F 1/133536; B29K 2029/04; B32B 2038/045; B32B 2457/202
See application file for complete search history.

(56) References Cited

U.S. PATENT DOCUMENTS 7,980,285 B2  7/2011  Kitada et al.
8,083,885 B2  12/2011  Kitada et al.
(Continued)

FOREIGN PATENT DOCUMENTS

JP      200260505 A      2/2002
JP      2002-196141 A    7/2002
(Continued)

OTHER PUBLICATIONS

Office Action dated Jun. 30, 2015, issued in counterpart Taiwanese application No. 102109099 (w/English translation) (6 pages).
(Continued)

*Primary Examiner* — Linda L Gray
(74) *Attorney, Agent, or Firm* — Westerman, Hattori, Daniels & Adrian, LLP

(57) ABSTRACT

A manufacturing method for a liquid crystal display panel includes slitting a first optical film having an elongate shape, to have a width corresponding to a pair of opposing sides of a liquid crystal cell, and by rolling the slit first optical film in its width direction to have a length corresponding to another pair of opposing sides of the liquid crystal cell; slitting a second optical film having an elongate shape, to have a width corresponding to a pair of opposing sides of the liquid crystal cell, and by rolling the slit second optical film in its width direction to have a length corresponding to
(Continued)

another pair of opposing sides of the liquid crystal cell; bonding the cut first optical film onto one surface of the liquid crystal cell; and bonding the cut second optical film onto another surface of the liquid crystal cell.

13 Claims, 11 Drawing Sheets

(51) Int. Cl.
G02F 1/1334 (2006.01)
B29D 11/00 (2006.01)
G02F 1/1333 (2006.01)
G02F 1/13 (2006.01)
G02F 1/1335 (2006.01)
B32B 38/00 (2006.01)
B29C 65/72 (2006.01)
B32B 37/18 (2006.01)

(52) U.S. Cl.
CPC ........ *B32B 38/0004* (2013.01); *G02F 1/1303* (2013.01); *G02F 1/133536* (2013.01); *B32B 37/185* (2013.01); *B32B 38/0008* (2013.01); *B32B 2038/0028* (2013.01); *B32B 2038/045* (2013.01); *B32B 2309/105* (2013.01); *B32B 2327/00* (2013.01); *B32B 2457/202* (2013.01); *G02F 2001/133562* (2013.01); *G02F 2001/133567* (2013.01); *Y10T 156/1074* (2015.01); *Y10T 156/1335* (2015.01)

(56) References Cited

U.S. PATENT DOCUMENTS

| | | | |
|---|---|---|---|
| 8,088,463 B2 | 1/2012 | Kitada et al. | |
| 8,114,237 B2 | 2/2012 | Kitada et al. | |
| 8,317,961 B2 | 11/2012 | Kitada et al. | |
| 8,427,625 B2 | 4/2013 | Koshio et al. | |
| 8,709,181 B2 | 4/2014 | Kitada et al. | |
| 9,244,307 B2 * | 1/2016 | Hada | G02B 5/3033 |
| 2005/0106334 A1 | 5/2005 | Kubo et al. | |
| 2009/0260738 A1 | 10/2009 | Kitada et al. | |
| 2009/0263608 A1 | 10/2009 | Kitada et al. | |
| 2010/0206977 A1 | 8/2010 | Kitada et al. | |
| 2010/0212822 A1 | 8/2010 | Kitada et al. | |
| 2010/0258250 A1 | 10/2010 | Kitada et al. | |
| 2010/0300606 A1 | 12/2010 | Kitada et al. | |
| 2011/0025958 A1 | 2/2011 | Koshio et al. | |
| 2011/0104423 A1 | 5/2011 | Kitada et al. | |
| 2011/0111667 A1 | 5/2011 | Kitada et al. | |
| 2011/0126988 A1 | 6/2011 | Kitada et al. | |
| 2012/0003400 A1 | 1/2012 | Nishimura et al. | |
| 2012/0031552 A1 | 2/2012 | Umemoto et al. | |
| 2012/0055608 A1 | 3/2012 | Kitagawa et al. | |
| 2012/0055623 A1 | 3/2012 | Kitagawa et al. | |
| 2012/0243089 A1 | 9/2012 | Araki et al. | |
| 2012/0291945 A1 | 11/2012 | Hada et al. | |
| 2013/0037219 A1 | 2/2013 | Kitada et al. | |
| 2013/0044374 A1 | 2/2013 | Kitada et al. | |
| 2013/0045350 A1 | 2/2013 | Kitada et al. | |
| 2014/0085723 A1 | 3/2014 | Hada et al. | |
| 2014/0090779 A1 | 4/2014 | Hada et al. | |
| 2015/0002792 A1 | 1/2015 | Hirata et al. | |
| 2015/0027626 A1 | 1/2015 | Hada et al. | |

FOREIGN PATENT DOCUMENTS

| | | |
|---|---|---|
| JP | 2009-276755 A | 11/2009 |
| JP | 2009-276757 A | 11/2009 |
| JP | 4406043 B2 | 1/2010 |
| JP | 2010-286830 A | 12/2010 |
| JP | 2012-198449 A | 10/2012 |
| JP | 2013-8005 A | 1/2013 |
| JP | 2013-8008 A | 1/2013 |
| TW | 200951580 A | 12/2009 |
| TW | 201038983 A | 11/2010 |
| TW | 201122675 A | 7/2011 |
| TW | 201206596 A | 2/2012 |

OTHER PUBLICATIONS

International Search Report of PCT/JP2013/057190, dated Jun. 18, 2013 (2 pages).
Office Action dated Apr. 29, 2015, issued in Taiwanese patent application No. 102109096, w/English Translation, counterpart of U.S. Appl. No. 14/373,866: Now U.S. Pat. No. 9,244,307.
International Search Report of PCT/JP2013/057191, dated Jun. 18, 2013 (Corresponds to U.S. Appl. No. 14/373,866: now U.S. Pat. No. 9,244,307).

* cited by examiner (a)

(b)

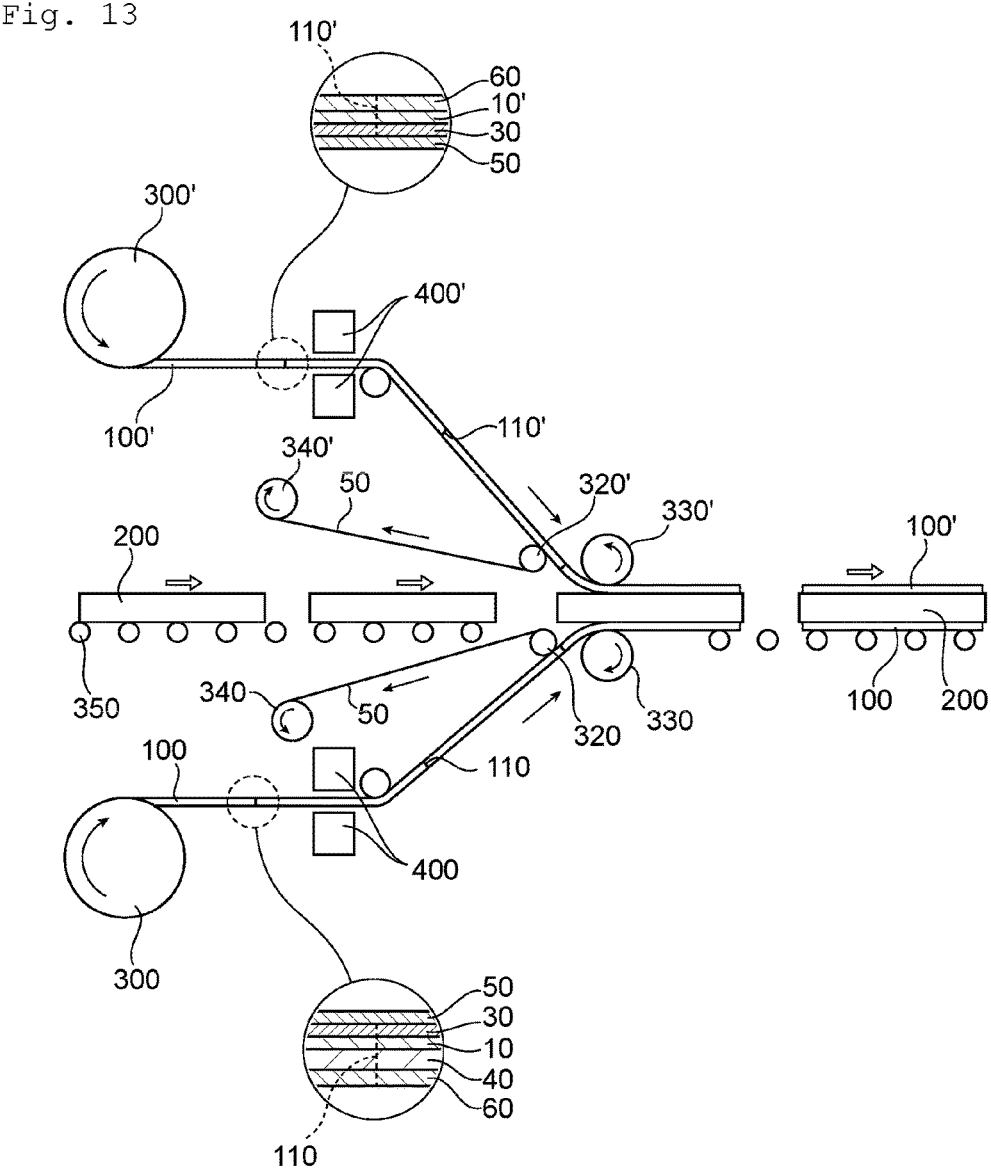

MANUFACTURING METHOD FOR LIQUID CRYSTAL DISPLAY

TECHNICAL FIELD

The present invention relates to a manufacturing method for a liquid crystal display panel.

BACKGROUND ART

There are many proposals concerning a method involving, in a manufacturing line for a liquid crystal display panel, cutting a roll-shaped optical film while feeding the optical film to attach the optical film to a liquid crystal cell (so-called roll-to-panel; RTP) (for example, Patent Literature 1). For example, in Patent Literature 1, there is a disclosure of a method involving: while feeding a long optical film from an optical film roll, cutting the optical film to a length corresponding to a long side of a liquid crystal cell to attach the optical film to one surface of the liquid crystal cell, the optical film roll being obtained by winding a long optical film that includes a polarizing film having an absorption axis in its longitudinal direction and has been subjected to cutting (slitting process) to a width corresponding to a short side of the liquid crystal cell; and then while feeding a roll-shaped optical film (optical laminate) that includes a polarizing film having an absorption axis in its longitudinal direction and has been subjected to a slitting process to a width corresponding to the long side of the liquid crystal cell, cutting the optical film to a length corresponding to the short side of the liquid crystal cell to attach the optical film to the other surface of the liquid crystal cell. In such method, however, in order to dispose polarizing films on both sides of the liquid crystal cell so that their absorption axes may be perpendicular to each other, it is necessary, for example, to rotate the liquid crystal cell 90° after attaching one of the optical films, or to dispose conveyance lines for long optical films from two optical film rolls so as to be perpendicular to each other. Consequently, there arises a problem in that a manufacturing apparatus is increased in complexity, size, and cost.

For example, it has been proposed that the problem involved in the technology disclosed in Patent Literature 1 can be solved by using a polarizing film having an absorption axis in its width direction for one of the optical films (for example, Patent Literature 2). However, when the polarizing film having an absorption axis in its width direction is used, there arises a problem in that display characteristics of a liquid crystal display panel to be obtained are insufficient.

CITATION LIST

Patent Literature

[PTL 1] JP 4406043 B2
[PTL 2] JP 2009-276757 A

SUMMARY OF INVENTION

Technical Problem

The present invention has been made in order to solve the problems of the related art, and an object of the present invention is to manufacture a liquid crystal display panel having excellent display characteristics with extremely high manufacturing efficiency using a simple manufacturing apparatus.

Means for Solving the Problems

According to one aspect of the present invention, a manufacturing method for a liquid crystal display panel is provided. The manufacturing method according to one embodiment of the present invention is a manufacturing method for a liquid crystal display panel including a liquid crystal cell and optical films arranged on both sides of the liquid crystal cell. In one embodiment of the present invention, the manufacturing method includes the steps of: cutting, while feeding a first optical film from an optical film roll, the optical film roll being obtained by slitting the first optical film having an elongate shape, which includes a reflective polarizing film having a reflection axis in its width direction and a polarizing film having an absorption axis in its width direction, so as to have a width corresponding to a pair of opposing sides of the liquid crystal cell, and by rolling the slit first optical film, the first optical film in its width direction so as to have a length corresponding to another pair of opposing sides of the liquid crystal cell; cutting, while feeding a second optical film from an optical film roll, the optical film roll being obtained by slitting the second optical film having an elongate shape, which includes a polarizing film having an absorption axis in its longitudinal direction, so as to have a width corresponding to a pair of opposing sides of the liquid crystal cell, and by rolling the slit second optical film, the second optical film in its width direction so as to have a length corresponding to another pair of opposing sides of the liquid crystal cell; bonding the cut first optical film onto one surface of the liquid crystal cell; and bonding the cut second optical film onto another surface of the liquid crystal cell.

In one embodiment of the invention, the polarizing film of the first optical film has a thickness of less than 10 μm.

In one embodiment of the invention, the bonding includes bonding one of the cut first optical film and the cut second optical film onto the one surface of the liquid crystal cell, and then bonding another of the cut first optical film and the cut second optical film onto the another surface of the liquid crystal cell.

In one embodiment of the invention, the width of the first optical film and the width of the second optical film each correspond to a short side of the liquid crystal cell, and the length of the cut first optical film and the length of the cut second optical film each correspond to a long side of the liquid crystal cell.

In one embodiment of the invention, the width of the first optical film and the width of the second optical film each correspond to a long side of the liquid crystal cell, and the length of the cut first optical film and the length of the cut second optical film each correspond to a short side of the liquid crystal cell.

In one embodiment of the invention, the bonding includes bonding the cut first optical film onto a surface of the liquid crystal cell on an opposite side to a viewer side.

In one embodiment of the invention, the first optical film includes the reflective polarizing film, the polarizing film, a pressure-sensitive adhesive layer and a release film in the stated order, and the cutting includes cutting the first optical film except for the release film.

In one embodiment of the invention, the manufacturing method includes the steps of: bonding, while feeding a first optical film from an optical film roll, the optical film roll being obtained by slitting the first optical film having an elongate shape, which includes a reflective polarizing film having a reflection axis in its width direction, a polarizing film having an absorption axis in its width direction, a pressure-sensitive adhesive layer, and a release film in the stated order, so as to have a width corresponding to a pair of opposing sides of the liquid crystal cell, forming cutting portions in a width direction of the first optical film except for the release film at an interval corresponding to another pair of opposing sides of the liquid crystal cell, and by rolling the first optical film, the first optical film onto one surface of the liquid crystal cell by peeling off the release film at each of the cutting portions; and bonding, while feeding a second optical film from an optical film roll, the optical film roll being obtained by slitting the second optical film having an elongate shape, which includes a polarizing film having an absorption axis in its longitudinal direction, a pressure-sensitive adhesive layer, and a release film in the stated order, so as to have a width corresponding to a pair of opposing sides of the liquid crystal cell, forming cutting portions in a width direction of the second optical film except for the release film at an interval corresponding to another pair of opposing sides of the liquid crystal cell, and by rolling the second optical film, the second optical film onto another surface of the liquid crystal cell by peeling off the release film at each of the cutting portions.

The manufacturing method according to another embodiment of the present invention is a manufacturing method for a liquid crystal display panel including a liquid crystal cell and an optical film arranged on at least one side of the liquid crystal cell. In one embodiment of the invention, the manufacturing method includes the steps of: cutting, while feeding the optical film from an optical film roll, the optical film roll being obtained by slitting the optical film having an elongate shape, which includes a reflective polarizing film having a reflection axis in its width direction and a polarizing film having an absorption axis in its width direction, so as to have a width corresponding to a pair of opposing sides of the liquid crystal cell, and by rolling the slit optical film, the optical film in its width direction so as to have a length corresponding to another pair of opposing sides of the liquid crystal cell; and bonding the cut optical film onto one surface of the liquid crystal cell.

In one embodiment of the invention, the manufacturing method includes bonding, while feeding the optical film from an optical film roll, the optical film roll being obtained by slitting the optical film having an elongate shape, which includes a reflective polarizing film having a reflection axis in its width direction, a polarizing film having an absorption axis in its width direction, a pressure-sensitive adhesive layer, and a release film in the stated order, so as to have a width corresponding to a pair of opposing sides of the liquid crystal cell, forming cutting portions in a width direction of the optical film except for the release film at an interval corresponding to another pair of opposing sides of the liquid crystal cell, and by rolling the optical film, the optical film onto one surface of the liquid crystal cell by peeling off the release film at each of the cutting portions.

In one embodiment of the invention, the manufacturing method further includes bonding, after the bonding the cut optical film onto the one surface of the liquid crystal cell, another optical film including a polarizing film onto another surface of the liquid crystal cell.

In one embodiment of the invention, a surface of the liquid crystal cell on an opposite side to the one surface, onto which the cut optical film is to be bonded, has bonded thereonto another optical film including a polarizing film.

In one embodiment of the invention, the liquid crystal cell includes a liquid crystal cell of a VA mode or a liquid crystal cell of an IPS mode.

According to another aspect of the invention, an apparatus for continuously manufacturing a liquid crystal display panel is provided. The apparatus according to one embodiment of the present invention is an apparatus for continuously manufacturing a liquid crystal display panel including a liquid crystal cell and optical films arranged on both sides of the liquid crystal cell. In one embodiment of the invention, the apparatus includes: a cell-conveying unit for conveying the liquid crystal cell; a first optical film-supplying unit for supplying a first optical film from an optical film roll, the optical film roll being obtained by slitting the first optical film having an elongate shape, which includes a reflective polarizing film having a reflection axis in its width direction and a polarizing film having an absorption axis in its width direction, so as to have a width corresponding to a pair of opposing sides of the liquid crystal cell, and by rolling the slit first optical film; a first cutting unit for cutting the supplied first optical film in its width direction so as to have a length corresponding to another pair of opposing sides of the liquid crystal cell while the supplied first optical film is conveyed; a second optical film-supplying unit for supplying a second optical film from an optical film roll, the optical film roll being obtained by slitting the second optical film having an elongate shape, which includes a polarizing film having an absorption axis in its longitudinal direction, so as to have a width corresponding to a pair of opposing sides of the liquid crystal cell, and by rolling the slit second optical film; a second cutting unit for cutting the supplied second optical film in its width direction so as to have a length corresponding to another pair of opposing sides of the liquid crystal cell while the supplied second optical film is conveyed; a first bonding unit for bonding the cut first optical film onto one surface of the liquid crystal cell while the liquid crystal cell is conveyed by the cell-conveying unit, and while the cut first optical film is conveyed; and a second bonding unit for bonding the cut second optical film onto another surface of the liquid crystal cell while the liquid crystal cell is conveyed by the cell-conveying unit, and while the cut second optical film is conveyed.

In one embodiment of the invention, the apparatus includes: a cell-conveying unit for conveying the liquid crystal cell; a first optical film-supplying unit for supplying a first optical film from an optical film roll, the optical film roll being obtained by slitting the first optical film having an elongate shape, which includes a reflective polarizing film having a reflection axis in its width direction, a polarizing film having an absorption axis in its width direction, a pressure-sensitive adhesive layer, and a release film in the stated order, so as to have a width corresponding to a pair of opposing sides of the liquid crystal cell, forming cutting portions in a width direction of the first optical film except for the release film at an interval corresponding to another pair of opposing sides of the liquid crystal cell, and by rolling the first optical film; a second optical film-supplying unit for supplying a second optical film from an optical film roll, the optical film roll being obtained by slitting the second optical film having an elongate shape, which includes a polarizing film having an absorption axis in its longitudinal direction, a pressure-sensitive adhesive layer, and a release film in the stated order, so as to have a width corresponding to a pair of opposing sides of the liquid crystal cell, forming cutting portions in a width direction of the second optical film except for the release film at an interval corresponding to another pair of opposing sides of the liquid crystal cell, and by rolling the second optical film; a first bonding unit for bonding the first optical film onto one surface of the liquid crystal cell by peeling off the release film at each of the cutting portions while the liquid crystal cell is conveyed by the cell-conveying unit, and while the supplied first optical film is conveyed; and a second bonding unit for bonding the second optical film onto another surface of the liquid crystal cell by peeling off the release film at each of the cutting portions while the liquid crystal cell is conveyed by the cell-conveying unit, and while the supplied second optical film is conveyed.

The apparatus according to another embodiment of the present invention is an apparatus for continuously manufacturing a liquid crystal display panel including a liquid crystal cell and an optical film arranged on at least one side of the liquid crystal cell. In one embodiment of the invention, the apparatus includes: a cell-conveying unit for conveying the liquid crystal cell; an optical film-supplying unit for supplying the optical film from an optical film roll, the optical film roll being obtained by slitting the optical film having an elongate shape, which includes a reflective polarizing film having a reflection axis in its width direction and a polarizing film having an absorption axis in its width direction, so as to have a width corresponding to a pair of opposing sides of the liquid crystal cell, and by rolling the slit optical film; a cutting unit for cutting the supplied optical film in its width direction so as to have a length corresponding to another pair of opposing sides of the liquid crystal cell while the supplied optical film is conveyed; and a bonding unit for bonding the cut optical film onto one surface of the liquid crystal cell while the liquid crystal cell is conveyed by the cell-conveying unit, and while the cut optical film is conveyed.

In one embodiment of the invention, the apparatus includes: a cell-conveying unit for conveying the liquid crystal cell; an optical film-supplying unit for supplying the optical film from an optical film roll, the optical film roll being obtained by slitting the optical film having an elongate shape, which includes a reflective polarizing film having a reflection axis in its width direction, a polarizing film having an absorption axis in its width direction, a pressure-sensitive adhesive layer, and a release film in the stated order, so as to have a width corresponding to a pair of opposing sides of the liquid crystal cell, forming cutting portions in a width direction of the optical film except for the release film at an interval corresponding to another pair of opposing sides of the liquid crystal cell, and by rolling the optical film; and a bonding unit for bonding the optical film onto one surface of the liquid crystal cell by peeling off the release film at each of the cutting portions while the liquid crystal cell is conveyed by the cell-conveying unit, and while the supplied optical film is conveyed.

Advantageous Effects of Invention

According to one embodiment of the present invention, the polarizing plate having an absorption axis in its width direction and the reflective polarizing film are bonded before the slitting process is performed to prepare the optical film, and thus a directional relationship between the absorption axis of the polarizing film and the reflection axis of the reflective polarizing film can be precisely controlled. Besides, the optical film can be bonded onto a predetermined position on the liquid crystal cell by having been slit so as to have a predetermined width as described above, and by being conveyed while being positioned. Therefore, in the bonding of the optical film onto the liquid crystal cell, an axis direction can be satisfactorily controlled. As a result, high manufacturing efficiency can be realized with the use of the polarizing plate having an absorption axis in its width direction, and a liquid crystal display panel having extremely excellent display characteristics can be obtained.

BRIEF DESCRIPTION OF DRAWINGS

FIG. 13 is a schematic lateral view illustrating a manufacturing method for a liquid crystal display panel according to still another embodiment of the present invention and a manufacturing apparatus to be used in the method.

DESCRIPTION OF EMBODIMENTS

Hereinafter, preferred embodiments of the present invention are described with reference to the drawings. However, the present invention is not limited to these specific embodiments.

I. Manufacturing Method for Liquid Crystal Display Panel

One embodiment of the present invention relates to a manufacturing method for a liquid crystal display panel. The liquid crystal display panel includes a liquid crystal cell and optical films arranged on both sides of the liquid crystal cell.

The optical films each include a polarizing plate including a polarizing film. In the liquid crystal display panel, the polarizing films on both sides of the liquid crystal cell typically have absorption axes substantially perpendicular to each other. The manufacturing method according to the one embodiment of the present invention includes the steps of: cutting, while feeding a first optical film from an optical film roll, the optical film roll being obtained by slitting the first optical film having an elongate shape, which includes a reflective polarizing film having a reflection axis in its width direction and a polarizing film having an absorption axis in its width direction, so as to have a width corresponding to a pair of opposing sides of the liquid crystal cell, and by rolling the slit first optical film, the first optical film in its width direction so as to have a length corresponding to the other pair of opposing sides of the liquid crystal cell; cutting, while feeding a second optical film from an optical film roll, the optical film roll being obtained by slitting the second optical film having an elongate shape, which includes a polarizing film having an absorption axis in its longitudinal direction, so as to have a width corresponding to a pair of opposing sides of the liquid crystal cell, and by rolling the slit second optical film, the second optical film in its width direction so as to have a length corresponding to the other pair of opposing sides of the liquid crystal cell; bonding the cut first optical film onto one surface of the liquid crystal cell; and bonding the cut second optical film onto the other surface of the liquid crystal cell.

A. First Optical Film

A-1. Entire Construction of First Optical Film

Figure 1A:
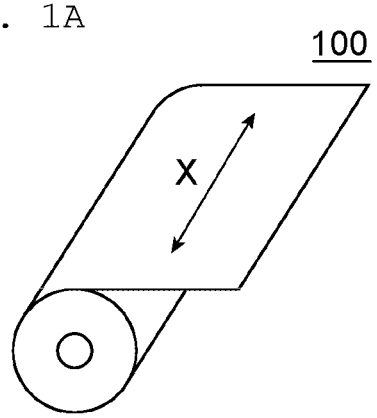
FIG. 1A is a schematic perspective view of an example of a first optical film to be used in a manufacturing method of the present invention.
Figure 1B:
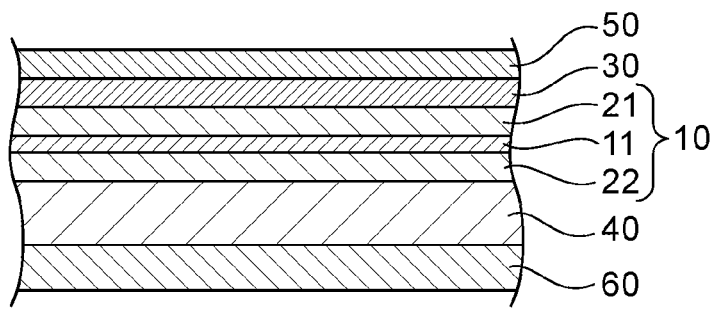
FIG. 1B is a partially enlarged cross-sectional view of the film of FIG. 1A.
Figure 1C:
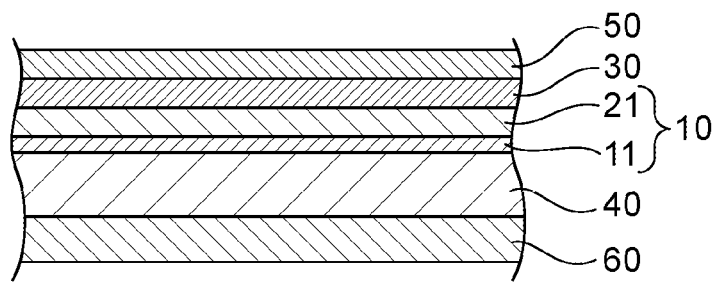
FIG. 1C is a partially enlarged cross-sectional view of a first optical film according to another embodiment.
Figure 1D:
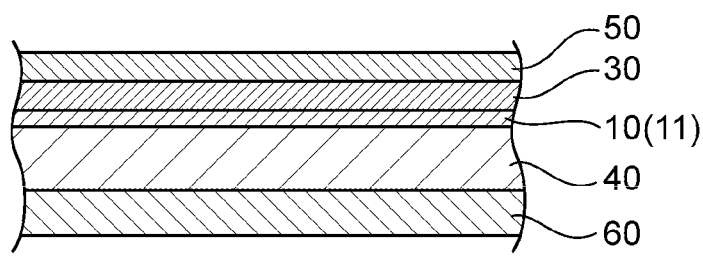
FIG. 1D is a partially enlarged cross-sectional view of a first optical film according to still another embodiment.

FIG. 1A is a schematic perspective view of an example of the first optical film to be used in the manufacturing method of the present invention, FIG. 1B is a partially enlarged cross-sectional view of the film of FIG. 1A, FIG. 1C is a partially enlarged cross-sectional view of a first optical film according to another embodiment, and FIG. 1D is a partially enlarged cross-sectional view of a first optical film according to still another embodiment.

A first optical film 100 includes a polarizing plate 10. In one embodiment, as illustrated in FIG. 1B, the polarizing plate 10 includes a polarizing film 11, a first protective film 21 arranged on one side of the polarizing film 11, and a second protective film 22 arranged on the other side of the polarizing film 11. In another embodiment, as illustrated in FIG. 1C, the polarizing plate 10 includes the polarizing film 11 and the first protective film 21 arranged on one side of the polarizing film 11. That is, the second protective film 22 may be omitted. In still another embodiment, as illustrated in FIG. 1D, the polarizing plate 10 may consist of the polarizing film 11. That is, the first protective film 21 and the second protective film 22 may both be omitted. The optical film 100 includes a pressure-sensitive adhesive layer 30 arranged on one side of the polarizing plate 10, and a reflective polarizing film 40 arranged on the other side of the polarizing plate 10. As illustrated in the figures, in a practical case, a release film 50 is bonded onto the surface of the pressure-sensitive adhesive layer 30, and a surface protective film 60 is arranged as an outermost layer on the opposite side (on the surface of the reflective polarizing film 40 in the illustrated examples). The first optical film 100 may include any other film (layer) (not shown). It should be noted that the release film is peeled off when the first optical film is actually used, and hence the first optical film in the form of including the release film and the first optical film in the form of not including the release film are both herein referred to as first optical film for the sake of convenience.

In the first optical film 100, the polarizing film 11 has an absorption axis in its width direction. In this context, the direction of the absorption axis of the polarizing film 11 may encompass directions at from −5° to +5° counterclockwise with respect to the width direction of the optical film. In addition, the reflective polarizing film 40 has a reflection axis in its width direction. In this context, the direction of the reflection axis of the reflective polarizing film 40 may encompass directions at from −5° to +5° counterclockwise with respect to the width direction of the optical film. Each member of the first optical film 100 is described below.

A-2. Polarizing Plate

The polarizing plate includes at least the polarizing film. The polarizing plate preferably has a construction in which a protective film is disposed on at least one side of the polarizing film.

A-2-1. Polarizing Film

The polarizing film is typically formed of a polyvinyl alcohol-based resin (hereinafter referred to as "PVA-based resin") film containing a dichromatic substance.

Examples of the dichromatic substance include iodine and an organic dye. They may be used alone or in combination. Of those, iodine is preferably used.

Any appropriate resin may be used as the PVA-based resin for forming the PVA-based resin film. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree may be determined in conformity with JIS K 6726-1994. The use of the PVA-based resin having such saponification degree can provide a polarizing film excellent in durability. When the saponification degree is excessively high, the resin may gel.

The average polymerization degree of the PVA-based resin may be appropriately selected depending on purposes. The average polymerization degree is typically from 1,000 to 10,000, preferably from 1,200 to 4,500, more preferably from 1,500 to 4,300. It should be noted that the average polymerization degree may be determined in conformity with JIS K 6726-1994.

The Nz coefficient of the PVA-based resin film is preferably 1.10 or more, more preferably 1.20 or more. When the alignment property of the PVA-based resin film (alignment state of polyvinyl alcohol-based resin molecules) is thus controlled, for example, a problem such as the generation of a crack (small chip or burr) in the edge side (slit surface) of the polarizing film in the case where a slitting process is continuously performed at a high speed to the width of a liquid crystal cell is suppressed, and thus accuracy (dimensional accuracy of the film) in cutting (including half-cutting) in the width direction of the optical film to be performed with reference to the edge side (slit surface) and attaching accuracy can be more easily obtained in the manufacturing method of the present invention. On the other hand, the Nz coefficient of the PVA-based resin film is preferably 1.50 or less, more preferably 1.40 or less. When the Nz coefficient is more than 1.50, the alignment property (uniaxiality) of the PVA-based resin film is low, and hence for example, display quality demanded of a liquid crystal television may not be obtained. It should be noted that the Nz coefficient is determined by Nz=(nx−nz)/(nx−ny). In the equation, "nx" represents a refractive index in a direction in which an in-plane refractive index is maximum (i.e., a slow axis direction), "ny" represents a refractive index in a direction perpendicular to the slow axis in a plane, and "nz" represents a refractive index in a thickness direction.

Figure 2:
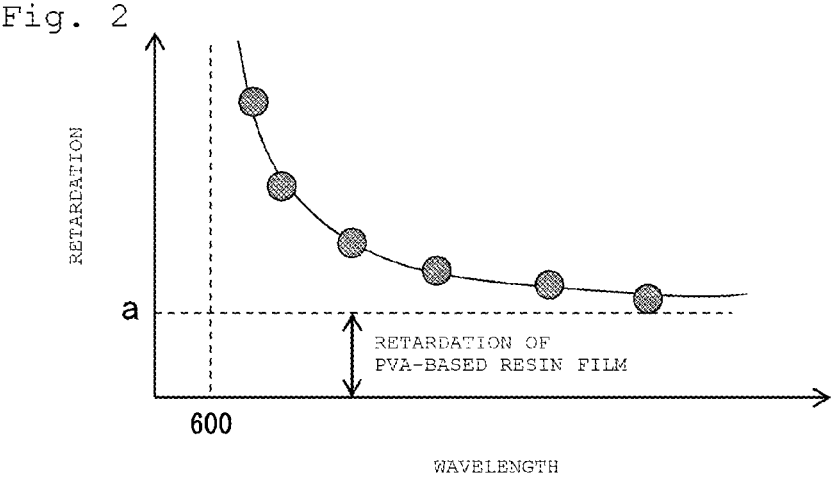
FIG. 2 is a graph illustrating a calculation method for the Nz coefficient of a polyvinyl alcohol-based resin film.

The Nz coefficient of the PVA-based resin film is an indicator for the alignment property of the molecular chains of the PVA-based resin film, and is calculated from the retardation of the PVA-based resin film. The retardation (a-value) of the PVA-based resin film is determined by: measuring the retardation of the polarizing film at various measurement wavelengths (λ); plotting the retardation of the polarizing film against the measurement wavelength on the horizontal axis as illustrated in FIG. 2; creating an approximate curve on the basis of the following equation; and calculating an asymptote (a-value) from the approximate curve. In this case, the retardation of the polarizing film is measured from its front and oblique directions.

$$R=a+b/(\lambda^2-600^2)$$

In the equation, R represents the retardation of the polarizing film, a represents the retardation of the PVA-based resin film, and b represents a constant.

The polarizing film preferably shows absorption dichroism at any wavelength in the wavelength range of from 380 nm to 780 nm. The polarization degree of the polarizing film at a single axis transmittance of 40% or 41% is preferably 99.9% or more, more preferably 99.93% or more, still more preferably 99.95% or more.

The thickness of the polarizing film may be set to any appropriate value. The thickness is preferably 30 μm or less, more preferably 25 μm or less, still more preferably 20 μm or less, particularly preferably less than 10 μm. In general, a polarizing film has a larger shrinkage force than a protective film, and hence a stress is generated at an interface between the polarizing film and the protective film, which may cause a crack. The shrinkage force of the polarizing film depends on its thickness. As the thickness becomes thinner, the shrinkage force reduces and a polarizing plate excellent in durability can be obtained. On the other hand, the thickness is preferably 0.5 μm or more, more preferably 1 μm or more. When the thickness is less than 0.5 μm, sufficient optical characteristics may not be obtained.

A-2-2. Manufacturing Method for Polarizing Film

The polarizing film is manufactured by any appropriate method as long as the film has an absorption axis in its width direction. The polarizing film is typically manufactured by appropriately subjecting a PVA-based resin film to treatment such as stretching or dyeing.

A-2-2-1. PVA-Based Resin Film

The PVA-based resin film is typically formed in a long shape. The thickness of the PVA-based resin film is preferably less than 100 μm. For example, the PVA-based resin film may be a PVA-based resin film, or may be a PVA-based resin layer formed on a thermoplastic resin substrate. The PVA-based resin film is preferably used in the case of manufacturing a polarizing film having a thickness of 10 μm or more. The thickness of the PVA-based resin film is preferably from 30 μm to 80 μm. A laminate of the thermoplastic resin substrate and the PVA-based resin layer is preferably used in the case of manufacturing a polarizing film having a thickness of less than 10 μm. The thickness of the PVA-based resin layer is preferably from 3 μm to 20 μm. Even with such thin thickness, the use of the thermoplastic resin substrate enables satisfactory stretching.

The thickness (before stretching) of the thermoplastic resin substrate for forming the laminate is preferably from 50 μm to 250 μm. When the thickness is less than 50 μm, the substrate may rupture at the time of its stretching. In addition, the substrate becomes so thin after the stretching that it may become difficult to convey the substrate. When the thickness exceeds 250 μm, an excessive load may be applied to a stretching machine. In addition, the conveyance may become difficult.

As a formation material for the thermoplastic resin substrate, there are given, for example: ester-based resins such as a polyethylene terephthalate-based resin; cycloolefin-based resins; olefin-based resins such as polypropylene; polyamide-based resins; polycarbonate-based resins; and copolymer resins thereof. Of those, a cycloolefin-based resin (such as a norbornene-based resin) and an amorphous polyethylene terephthalate-based resin are preferred. Specific examples of the amorphous polyethylene terephthalate-based resin include a copolymer further containing isophthalic acid as a dicarboxylic acid and a copolymer further containing cyclohexanedimethanol as a glycol.

The glass transition temperature (Tg) of the thermoplastic resin substrate is preferably 170° C. or less. The use of such thermoplastic resin substrate enables the stretching of the laminate at such a temperature that the crystallization of a PVA-based resin does not rapidly progress, and can suppress an inconvenience due to the crystallization (e.g., the inhibition of the alignment of the PVA-based resin layer by the stretching). It should be noted that the glass transition temperature (Tg) is a value determined in conformity with JIS K 7121.

The thermoplastic resin substrate is preferably stretched before the formation of the PVA-based resin layer. A stretching direction may be set to any appropriate direction. In one embodiment, the stretching direction is the machine direction (MD) of the thermoplastic resin substrate. The machine direction is preferably the lengthwise direction of the long thermoplastic resin substrate, which may encompass directions at from −5° to +5° counterclockwise with respect to the lengthwise direction of the thermoplastic resin substrate. In another embodiment, the stretching direction is a direction (TD) perpendicular to the machine direction. The direction perpendicular to the machine direction is preferably the width direction of the long thermoplastic resin substrate, which may encompass directions at from 85° to 95° counterclockwise with respect to the lengthwise direction of the thermoplastic resin substrate. It should be noted that the term "perpendicular" as used herein also includes "substantially perpendicular". Herein, the term "substantially perpendicular" includes a case at 90°±5.0°, preferably 90°±3.0°, more preferably 90°±1.0°.

Any appropriate method may be adopted as a method of stretching the thermoplastic resin substrate. Specifically, fixed-end stretching may be adopted, or free-end stretching (such as a method involving passing the thermoplastic resin substrate between rolls having different peripheral speeds to uniaxially stretch the thermoplastic resin substrate) may be adopted. The stretching of the thermoplastic resin substrate may be performed in one stage, or may be performed in a plurality of stages. When the stretching is performed in a plurality of stages, the stretching ratio of the thermoplastic resin substrate to be described later is the product of stretching ratios in the respective stages. In addition, a stretching mode in this step is not particularly limited, and may be an in-air stretching mode, or may be an underwater stretching mode.

The stretching temperature of the thermoplastic resin substrate may be set to any appropriate value depending on, for example, a formation material for the thermoplastic resin substrate and the stretching mode. The stretching temperature is typically equal to or higher than the glass transition temperature (Tg) of the thermoplastic resin substrate, preferably Tg+10° C. or more, still more preferably from Tg+15° C. to Tg+30° C. When the underwater stretching mode is adopted as the stretching mode and an amorphous polyethylene terephthalate-based resin is used as the formation material for the thermoplastic resin substrate, the stretching temperature may be set lower than the glass transition temperature (for example, from 60° C. to 100° C.) of the thermoplastic resin substrate.

The stretching ratio of the thermoplastic resin substrate is preferably 1.5 times or more, more preferably 1.75 times or more with respect to the original length of the thermoplastic resin substrate. When the stretching ratio is set to 1.5 times or more, the laminate to be described later can be shrunk more uniformly. On the other hand, the stretching ratio is preferably 2.5 times or less.

The thermoplastic resin substrate may be subjected to surface modification treatment (such as corona treatment) in advance, or an easy-adhesion layer may be formed on the thermoplastic resin substrate. The performance of such treatment can improve adhesiveness between the thermoplastic resin substrate and the PVA-based resin layer. It should be noted that the surface modification treatment and/or the formation of the easy-adhesion layer may be performed before the stretching or may be performed after the stretching.

Any appropriate method may be adopted as a method of forming the PVA-based resin layer. The PVA-based resin layer is preferably formed by applying an application liquid containing the PVA-based resin onto the thermoplastic resin substrate and drying the liquid. It should be noted that the thus obtained PVA-based resin layer may be used not only as the laminate (as formed on the thermoplastic resin substrate), but also as a PVA-based resin film after being peeled from the thermoplastic resin substrate.

The application liquid is typically a solution prepared by dissolving the PVA-based resin in a solvent. Examples of the solvent include water, dimethyl sulfoxide, dimethylformamide, dimethylacetamide, N-methylpyrrolidone, various glycols, polyhydric alcohols such as trimethylolpropane, and amines such as ethylenediamine and diethylenetriamine. They may be used alone or in combination. Of those, water is preferred. The concentration of the PVA-based resin in the solution is preferably from 3 parts by weight to 20 parts by weight with respect to 100 parts by weight of the solvent. At such resin concentration, a uniform coating film in close contact with the thermoplastic resin substrate can be formed.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Such additive may be used for the purpose of additionally improving the uniformity, dyeing property, or stretchability of the PVA-based resin layer to be obtained.

Any appropriate method may be adopted as an application method for the application liquid. Examples thereof include a roll coating method, a spin coating method, a wire bar coating method, a dip coating method, a die coating method, a curtain coating method, a spray coating method, and a knife coating method (such as a comma coating method).

The drying temperature is preferably equal to or less than the glass transition temperature (Tg) of the thermoplastic resin substrate, more preferably equal to or less than Tg-20° C. Drying the liquid at such temperature prevents the thermoplastic resin substrate from deforming before the formation of the PVA-based resin layer, and hence can prevent the deterioration of the alignment property of the PVA-based resin layer to be obtained. Thus, the thermoplastic resin substrate can satisfactorily deform together with the PVA-based resin layer, and hence the shrinkage and stretching of the laminate to be described later can be satisfactorily performed. As a result, good alignment property can be imparted to the PVA-based resin layer, and hence a polarizing film having excellent optical characteristics can be obtained. The term "alignment property" as used herein refers to the alignment of molecular chains in the PVA-based resin layer.

The water content of the PVA-based resin layer is preferably 20% or less, more preferably 15% or less.

A-2-2-2. Stretching

Figure 4:
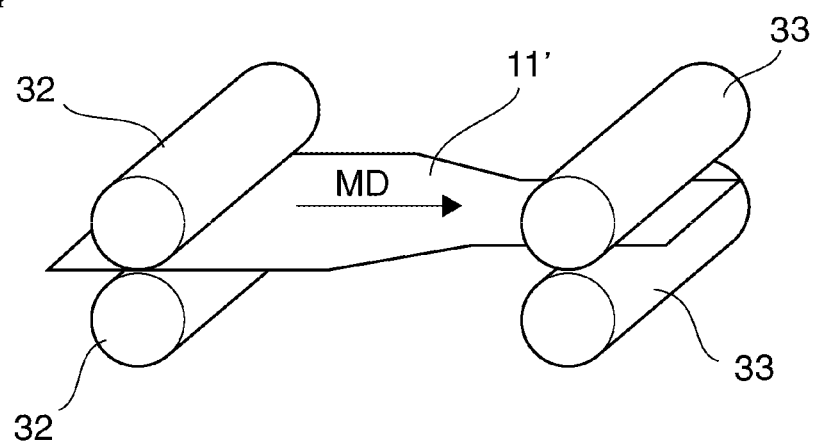
FIG. 4 is a schematic view illustrating a specific example of a manufacturing method for a polarizing film in the first optical film.

As a stretching method, for example, there are given: fixed-end stretching using a tenter stretching machine; free-end stretching using rolls having different peripheral speeds; biaxial stretching using a simultaneous biaxial stretching machine; and sequential biaxial stretching. They may be used alone or in combination. Specifically, in the case where, as illustrated in FIG. 4, a PVA-based resin film 11' is passed between rolls 32, 32, 33, 33 having different peripheral speeds to be stretched in the machine direction (MD) (free-end stretching), for example, there is given a mode in which the stretching in the machine direction is combined with stretching in the direction (TD) perpendicular to the machine direction. It should be noted that the Nz coefficient may be controlled by appropriately selecting stretching conditions such as the stretching method, the stretching ratio, and the stretching temperature. A preferred embodiment is specifically described below.

In a preferred embodiment, the polarizing film is manufactured by shrinking and stretching the PVA-based resin film in the machine direction (MD) and the direction (TD) perpendicular to the machine direction, respectively. According to such embodiment, for example, the Nz coefficient can be satisfactorily satisfied. In this case, the machine direction is preferably the lengthwise direction of the long PVA-based resin film, which may encompass directions at from −5° to +5° counterclockwise with respect to the lengthwise direction of the PVA-based resin film. The direction perpendicular to the machine direction is preferably the width direction of the long PVA-based resin film, which may encompass directions at from 85° to 95° counterclockwise with respect to the lengthwise direction of the PVA-based resin film.

When a laminate is constructed with a thermoplastic resin substrate that has been subjected to stretching treatment in the MD in advance, the thermoplastic resin substrate can be ready to return to the state before the stretching by the stretching in the TD, heat, and the like, and hence the laminate can be uniformly shrunk in the MD. Thus, even when the shrinkage ratio is high, a problem such as the occurrence of alignment unevenness or a reduction in thickness uniformity can be suppressed to provide a polarizing film having excellent in-plane uniformity. In addition, when the laminate is stretched in the TD while being shrunk, uniaxiality in the TD can be improved and excellent optical characteristics can be obtained.

When a laminate is constructed with a thermoplastic resin substrate that has been subjected to fixed-end stretching in the TD in advance, in the thermoplastic resin substrate, a shrinking force is generated in the MD as well owing to, for example, heat at the time of the stretching in the TD, and hence the deterioration of the uniformity due to necking between the clips, which emerges as a problem in the case where the laminate is subjected to fixed-end stretching in the TD (not shrunk in the MD), can be suppressed. In particular, even when a PVA-based resin film having a thin thickness is stretched at a high ratio, a problem such as alignment unevenness or a reduction in thickness uniformity can be suppressed to provide a polarizing film having excellent in-plane uniformity. In addition, when the laminate is stretched in the TD while being shrunk, uniaxiality in the TD can be improved and excellent optical characteristics can be obtained.

The shrinkage may be performed simultaneously with the stretching, or the shrinkage and the stretching may be performed at different timings. In addition, the order in which the shrinkage and the stretching are performed is not limited, and the shrinkage may be performed in one stage, or may be performed in a plurality of stages. In one embodiment, it is preferred that the PVA-based resin film be stretched in the TD while being shrunk in the MD. In another embodiment, it is preferred that the PVA-based resin film be stretched in the TD after having been shrunk in the MD. A method of shrinking the laminate separately from the stretching is preferably, for example, a method involving heating (thermally shrinking) the laminate. The heating temperature is preferably equal to or more than the glass transition temperature (Tg) of the thermoplastic resin substrate.

For example, through the adjustment of the shrinkage ratio of the PVA-based resin film, the Nz coefficient can be satisfactorily satisfied. In one embodiment, the shrinkage ratio of the PVA-based resin film in the MD is preferably 40% or less, more preferably 35% or less, particularly preferably 20% or less. Excellent durability can be achieved. It should be noted that the shrinkage in the MD may be omitted as long as the Nz coefficient can be satisfactorily satisfied. For example, the lower limit of the shrinkage ratio in the MD may be 0% in one embodiment, and may be 5% in another embodiment.

In another embodiment, the shrinkage ratio in the MD is preferably more than 25%, more preferably more than 30% and less than 50%.

The stretching of the PVA-based resin film may be performed in one stage, or may be performed in a plurality of stages. When the stretching is performed in a plurality of stages, the stretching ratio of the PVA-based resin film to be described later is the product of stretching ratios in the respective stages. In addition, a stretching mode in this step is not particularly limited, and may be an in-air stretching (dry stretching) mode, or may be an underwater stretching (wet stretching) mode.

The stretching temperature may be set to any appropriate value depending on, for example, the stretching mode and the object to be stretched. For example, the stretching temperature in the case of stretching the laminate of the thermoplastic resin substrate and the PVA-based resin layer by the in-air stretching mode may be set to any appropriate value depending on, for example, a formation material for the thermoplastic resin substrate. The stretching temperature is typically equal to or higher than the glass transition temperature (Tg) of the thermoplastic resin substrate, preferably the glass transition temperature (Tg) of the thermoplastic resin substrate+10° C. or more, still more preferably Tg+15° C. or more. On the other hand, the stretching temperature is preferably 170° C. or less. When the stretching is performed at such temperature, rapid progress of the crystallization of the PVA-based resin can be suppressed, to thereby suppress a problem due to the crystallization (for example, rupture at the time of the stretching of the PVA-based resin film).

The stretching temperature in the case of stretching the PVA-based resin film by the in-air stretching mode is typically from 70° C. to 130° C., preferably from 80° C. to 120° C.

When the underwater stretching mode is adopted, the stretching temperature is preferably 85° C. or less, more preferably from 30° C. to 65° C. When the temperature exceeds 85° C., an inconvenience such as the elution of iodine caused to adsorb to the PVA-based resin or the elution of the PVA-based resin may occur, and hence the optical characteristics of the polarizing film to be obtained may reduce. In this case, a thermoplastic resin substrate that can be stretched even at the temperature is selected. An amorphous polyethylene terephthalate-based resin, olefin-based resin (such as polymethylpentene), or the like is preferably used as a formation material therefor.

When the underwater stretching mode is adopted, the PVA-based resin film is preferably stretched in an aqueous solution of boric acid. The use of the aqueous solution of boric acid can impart, to the PVA-based resin film, rigidity enough to withstand a tension to be applied at the time of the stretching and such water resistance that the layer does not dissolve in water. Specifically, boric acid can produce a tetrahydroxyborate anion in the aqueous solution to crosslink with the PVA-based resin through a hydrogen bond, and thus the rigidity and the water resistance can be imparted thereto. As a result, for example, a higher contrast ratio of the polarizing film can be achieved. The aqueous solution of boric acid is obtained by dissolving boric acid and/or a borate in water as a solvent. The concentration of boric acid is typically from 1 part by weight to 10 parts by weight with respect to 100 parts by weight of water. The immersion time of the PVA-based resin film in the stretching bath is preferably from about 15 seconds to 5 minutes.

The TD stretching ratio is preferably 4.0 times or more with respect to the original length of the PVA-based resin film. The shrinking in the MD enables the stretching at such high ratio, and thus a polarizing film having excellent optical characteristics can be obtained. On the other hand, the stretching ratio in the TD is preferably 6.0 times or less, more preferably 5.5 times or less.

Figure 3:
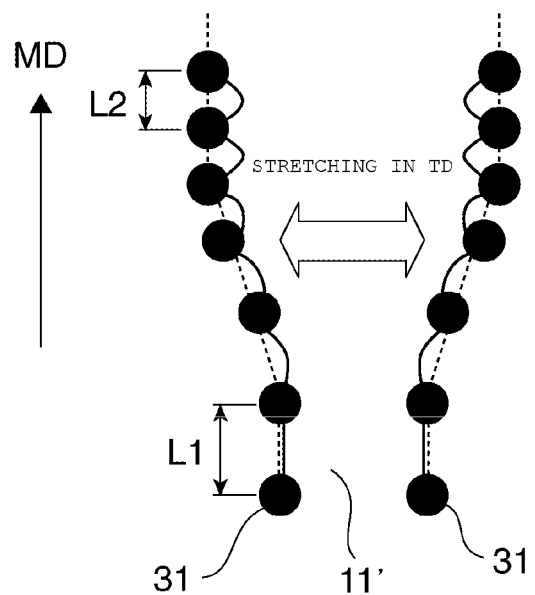
FIG. 3 is a schematic view illustrating a specific example of a manufacturing method for a polarizing film in the first optical film.

FIG. 3 illustrates a specific example of a shrinking and stretching step. In the illustrated example, while the PVA-based resin film 11' is conveyed in its lengthwise direction, the PVA-based resin film 11' is shrunk in the machine direction (MD) and stretched in the direction (TD) perpendicular to the machine direction using a simultaneous biaxial stretching machine. Specifically, the PVA-based resin film 11' held with left and right clips 31, 31 at a tenter inlet is stretched in the TD while being conveyed at a predetermined speed. In the illustrated example, the shrinkage of the PVA-based resin film is controlled by, for example, gradually reducing the moving speed of each clip in the machine direction to shorten a distance between the clips. The shrinkage ratio may be controlled by adjusting a distance L1 between the clips in the machine direction at the tenter inlet and a distance L2 between the clips in the machine direction at a tenter outlet (moving speed of each clip in the machine direction). Specifically, a desired shrinkage ratio can be achieved by setting the speed of each clip at the tenter outlet to "speed at tenter inlet×(1−shrinkage ratio)." It should be noted that a broken line in FIG. 3 represents a rail for the clip 31.

In the case where, as illustrated in FIG. 3, the PVA-based resin film is shrunk and stretched using the simultaneous biaxial stretching machine, the PVA-based resin film is preferably shrunk before being stretched. Specifically, the distance between the clips in the machine direction is shortened before the PVA-based resin film is stretched in the TD. According to such embodiment, a force is more uniformly applied to the PVA-based resin film during the stretching, and hence a portion held with each clip can be prevented from being selectively stretched. Specifically, a portion not held with any clip can be prevented from curving inward at an edge side of the PVA-based resin film. As a result, uniformity can be improved.

A-2-2-3. Other Treatments

Treatment for manufacturing the polarizing film except the stretching treatment is, for example, dyeing treatment, insolubilizing treatment, cross-linking treatment, washing treatment, or drying treatment. Those treatments may each be performed at any appropriate timing.

The dyeing treatment is typically treatment involving dyeing the PVA-based resin film with the dichromatic substance. The treatment is preferably performed by causing the dichromatic substance to adsorb to the PVA-based resin film. A method for the adsorption is, for example, a method involving immersing the PVA-based resin film in a dyeing liquid containing the dichromatic substance, a method involving applying the dyeing liquid to the PVA-based resin film, or a method involving spraying the PVA-based resin film with the dyeing liquid. Of those, a method involving immersing the PVA-based resin film in a dyeing liquid containing the dichromatic substance is preferred. This is because the dichromatic substance can satisfactorily adsorb to the film.

When iodine is used as the dichromatic substance, the dyeing liquid is preferably an aqueous solution of iodine. The compounding amount of iodine is preferably from 0.04 part by weight to 5.0 parts by weight with respect to 100 parts by weight of water. The aqueous solution of iodine is preferably compounded with an iodide salt in order that the solubility of iodine in water may be improved. Examples of the iodide salt include potassium iodide, lithium iodide, sodium iodide, zinc iodide, aluminum iodide, lead iodide, copper iodide, barium iodide, calcium iodide, tin iodide, and titanium iodide. Of those, potassium iodide and sodium iodide are preferred. The compounding amount of the iodide salt is preferably from 0.3 part by weight to 15 parts by weight with respect to 100 parts by weight of water.

The liquid temperature of the dyeing liquid at the time of the dyeing is preferably from 20° C. to 40° C. When the PVA-based resin film is immersed in the dyeing liquid, an immersion time is preferably from 5 seconds to 300 seconds. Under such conditions, the dichromatic substance can be sufficiently caused to adsorb to the PVA-based resin film.

The insolubilizing treatment and cross-linking treatment are typically performed by immersing the PVA-based resin film in an aqueous solution of boric acid. The washing treatment is typically performed by immersing the PVA-based resin film in an aqueous solution of potassium iodide. A drying temperature in the drying treatment is preferably from 30° C. to 100° C.

A-2-3. Protective Film

As a formation material for the protective film, there are given, for example: (meth)acrylic resins; cellulose-based resins such as diacetyl cellulose and triacetyl cellulose; cycloolefin-based resins; olefin-based resins such as polypropylene; ester-based resins such as a polyethylene terephthalate-based resin; polyamide-based resins; polycarbonate-based resins; and copolymer resins thereof. It should be noted that the thermoplastic resin substrate may be used as it is as the protective film.

The thickness of the protective film is preferably from 20 μm to 100 μm. The protective film may be laminated on the polarizing film through an adhesion layer (specifically an adhesive layer or a pressure-sensitive adhesive layer), or may be laminated so as to be in close contact with the polarizing film (without through any adhesion layer). The adhesive layer is formed of any appropriate adhesive. The adhesive is, for example, a polyvinyl alcohol-based adhesive.

A-3. Pressure-Sensitive Adhesive Layer

The pressure-sensitive adhesive layer may be formed of any appropriate pressure-sensitive adhesive. An acrylic pressure-sensitive adhesive is typically used. The thickness of the pressure-sensitive adhesive layer is preferably from 7 μm to 25 μm.

A-4. Reflective Polarizing Film

Figure 5:
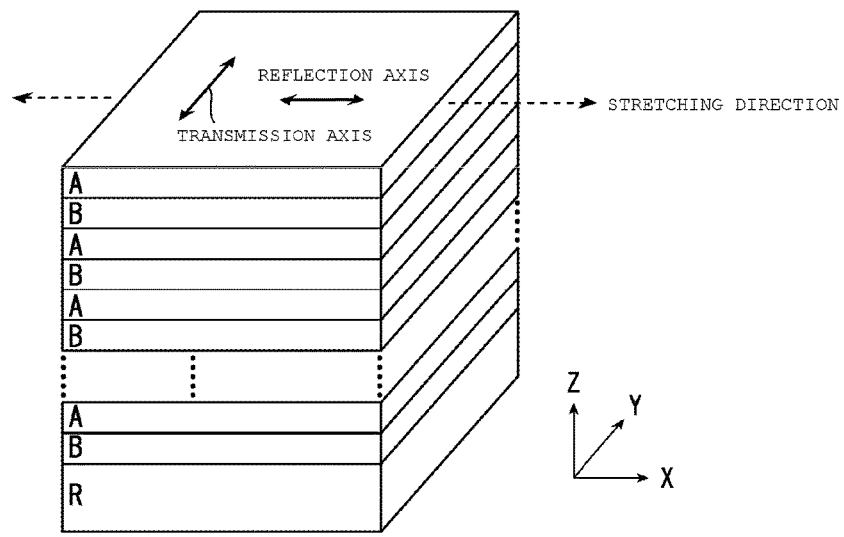
FIG. 5 is a schematic perspective view of an example of a reflective polarizing film in the first optical film.

The reflective polarizing film is typically, for example, a linearly polarized light separation-type reflective polarizing film. FIG. 5 is a schematic perspective view of an example of the reflective polarizing film. The reflective polarizing film is a multilayer laminate in which a layer A having birefringence and a layer B substantially free of birefringence are alternately laminated. For example, in the illustrated example, a refractive index nx in the x-axis direction of the layer A is larger than a refractive index ny in the y-axis direction of the layer, and a refractive index nx in the x-axis direction of the layer B and a refractive index ny in the y-axis direction of the layer are substantially equal to each other. Therefore, a difference in refractive index between the layer A and the layer B is large in the x-axis direction and is substantially zero in the y-axis direction. As a result, the x-axis direction serves as a reflection axis and the y-axis direction serves as a transmission axis. The difference in refractive index between the layer A and the layer B in the x-axis direction is preferably from 0.2 to 0.3. It should be noted that the x-axis direction corresponds to the stretching direction of the reflective polarizing film in a production method to be described later.

The layer A is preferably formed of a material that expresses birefringence through stretching. Typical examples of such material include a naphthalene dicarboxylic acid polyester (such as polyethylene naphthalate), polycarbonate, and an acrylic resin (such as polymethyl methacrylate). Of those, polyethylene naphthalate is preferred. The layer B is preferably formed of a material that is substantially free of expressing birefringence even when stretched. A typical example of such material is a copolyester of naphthalene dicarboxylic acid and terephthalic acid.

The reflective polarizing film transmits light having a first polarization direction (such as a p-wave), and reflects light having a second polarization direction perpendicular to the first polarization direction (such as an s-wave) at an interface between the layer A and the layer B. At the interface between the layer A and the layer B, part of the reflected light is transmitted as light having the first polarization direction and the other part thereof is reflected as light having the second polarization direction. Such reflection and transmission are repeated a plurality of times in the reflective polarizing film. Thus, the utilization efficiency of light can be improved.

As illustrated in FIG. 5, the reflective polarizing film preferably includes a reflecting layer R as an outermost layer opposite to the polarizing film 11. When the reflecting layer R is provided, light that has finally returned to the outermost portion of the reflective polarizing film without being utilized can be additionally utilized, and hence the utilization efficiency of light can be additionally improved. The reflecting layer R typically expresses a reflecting function by virtue of the multilayer structure of a polyester resin layer.

The entire thickness of the reflective polarizing film may be appropriately set depending on, for example, purposes and the total number of layers in the reflective polarizing film. The entire thickness of the reflective polarizing film is preferably from 20 μm to 600 μm.

A film described in, for example, JP 9-507308 A may be used as the reflective polarizing film.

A commercial product may be used as it is as the reflective polarizing film, or the commercial product may be subjected to secondary processing (such as stretching) before use. The commercial product is, for example, a product available under the trade name "DBEF" from 3M Company or a product available under the trade name "APF" from 3M Company.

The reflective polarizing film may be typically produced by combining co-extrusion and lateral stretching. The co-extrusion may be performed by any appropriate system. For example, a feed block system may be adopted or a multi-manifold system may be adopted. For example, the material constituting the layer A and the material constituting the layer B are extruded in a feed block, and then the resultant is multilayered with a multiplier. It should be noted that such multilayering apparatus is known to a person skilled in the art. Next, the resultant long multilayer laminate is typically stretched in the direction (TD) perpendicular to the machine direction. The material constituting the layer A (such as polyethylene naphthalate) is increased in refractive index only in the stretching direction by the lateral stretching, and as a result, expresses birefringence. The material constituting the layer B (such as a copolyester of naphthalene dicarboxylic acid and terephthalic acid) is not increased in refractive index in any direction even by the lateral stretching. As a result, a reflective polarizing film having a reflection axis in the stretching direction (TD) and having a transmission axis in the machine direction (MD) can be obtained (the TD corresponds to the x-axis direction of FIG. 2 and the MD corresponds to the y-axis direction of the figure). It should be noted that a stretching operation may be performed with any appropriate apparatus.

The first optical film is obtained by laminating the reflective polarizing film and the polarizing film by any appropriate method. As described above, the polarizing film has an absorption axis in the TD, and thus the polarizing film and the reflective polarizing film can be bonded onto each other by roll-to-roll. In the manufacturing method of the present invention, the polarizing film and the reflective polarizing film are bonded onto each other before the cutting to the size of the liquid crystal cell. Accordingly, an axis shift of the absorption axis and the reflection axis due to cutting and bonding after the cutting can be prevented. Further, the polarizing film and the reflective polarizing film can be bonded onto each other by roll-to-roll, and hence, through their conveyance and bonding with appropriate positioning, axis variation for each cut piece can be prevented. Thus, the first optical film can be obtained simply with high manufacturing efficiency while a directional relationship between the absorption axis of the polarizing film and the reflection axis of the reflective polarizing film is precisely controlled.

The use of the reflective polarizing film can improve light utilization efficiency to realize high contrast in the liquid crystal display panel to be obtained. In addition, when the thickness of the polarizing film is thin (for example, less than 10 μm), its combined use with the reflective polarizing film can impart sufficient rigidity to the optical film to improve cutting properties (in particular, slitting process accuracy). Accordingly, its axis direction can be satisfactorily adjusted upon lamination with another optical member (for example, a liquid crystal cell) in the manufacturing method of the present invention. As a result, there can be provided a liquid crystal display panel that is more excellent in display characteristics.

A-5. Release Film

The release film typically includes a plastic film and a releasability-imparting layer provided on one side of the plastic film. A polyester film is preferably used as the plastic film. The thickness of the release film is preferably from 25 μm to 50 μm. In the manufacturing method of the present invention, the release film is peeled off and removed when the first optical film is bonded onto the liquid crystal cell.

A-6. Surface Protective Film

The surface protective film may function as a protective film for the polarizing plate. The surface protective film is typically a plastic film or a laminate of plastic films. A material for the plastic film is, for example, polyester or polypropylene. The thickness of the surface protective film is preferably from 25 μm to 75 μm. In the manufacturing method of the present invention, the surface protective film is peeled off and removed at any appropriate timing after the bonding of the first optical film onto the liquid crystal cell.

A-7. Other Layer

An example of the other film (layer) is a retardation plate. In the lamination of the constituent layers of the optical film, any appropriate pressure-sensitive adhesive or adhesive is typically used.

A-8. Slitting Process

Figure 6:
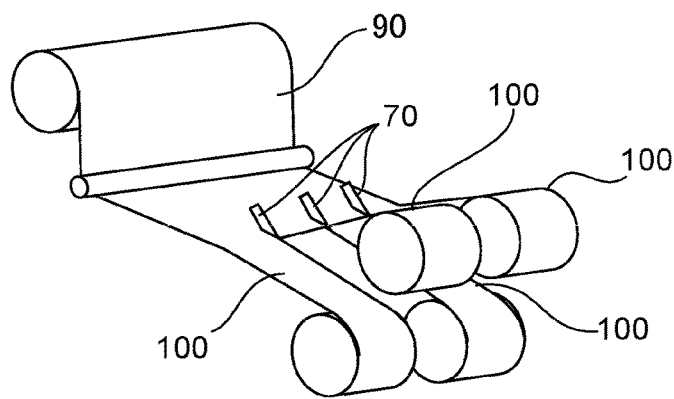
FIG. 6 is a schematic perspective view illustrating details of a slitting process.

The first optical film 100 is slit and rolled into a roll shape. It should be noted that the first optical film before the slitting process is herein sometimes referred to as first optical raw film. The slitting process is performed by: continuously cutting a first optical raw film having an elongate shape so as to have a predetermined width while conveying the first optical raw film having an elongate shape in its longitudinal direction; and rolling the cut film into a roll shape. A slitting mode is exemplified by a shear mode, a gang mode, and a laser mode. FIG. 6 is a schematic perspective view illustrating details of the slitting process. In FIG. 6, the gang mode is adopted as the slitting mode, and a cutting apparatus 70 including a gang blade is illustrated. As illustrated in FIG. 6, a plurality of the first optical films (optical film rolls) 100 may be obtained from a first optical raw film 90. The number of first optical films to be obtained from the raw film may be appropriately set depending on purposes. The width of the slit first optical film has a length corresponding to a pair of opposing sides of the liquid crystal cell. The term "length corresponding to a pair of opposing sides of the liquid crystal cell" as used herein refers to a length that allows an appropriate margin during manufacture (specifically, an exposed portion onto which the optical film is not bonded) to be secured at the edge portion of the liquid crystal cell when the optical film is positioned and bonded onto the liquid crystal cell. In other words, when the pair of opposing sides of the liquid crystal cell is, for example, sides in its vertical direction, the "length corresponding" refers to the length of the liquid crystal cell excluding exposed portions at both end portions in its vertical direction, and when the pair of opposing sides of the liquid crystal cell is, for example, sides in its horizontal direction, the "length corresponding" refers to the length of the liquid crystal cell excluding exposed portions at both end portions in its horizontal direction. The first optical film including the polarizing film as described in the section A-2 does not meander during its conveyance, and as a result, is neither floated at a cut portion in a slitting process nor obliquely cut. Therefore, the absorption axis does not deviate from the width direction even when the slitting process is performed. In addition, as described above, in the first optical film, the polarizing film and the reflective polarizing film are bonded onto each other in advance by roll-to-roll, and the directional relationship between the absorption axis of the polarizing film and the reflection axis of the reflective polarizing film is precisely controlled. Further, by virtue of the bonding of the polarizing film and the reflective polarizing film onto each other in advance, sufficient rigidity is imparted to the optical raw film even when the polarizing film is thin (for example, less than 10 μm), and thus the meandering during the conveyance or the floating at the cut portion is suppressed more satisfactorily. More specifically, when the thickness of the polarizing film is thin, its rigidity is low, and hence the slitting process accuracy in the case of the polarizing film (polarizing plate) alone may not be sufficiently secured. Failure to secure the slitting process accuracy may lead to a reduction in axis accuracy with respect to the reflective polarizing film or a reduction in the accuracy of the slit width. When the polarizing film and the reflective polarizing film are laminated in advance, not only the absorption axis of the polarizing film and the reflection axis of the reflective polarizing film can be allowed to overlap with high accuracy (a structure in which the polarization degree of the polarizing film can be sufficiently compensated with the reflective polarizing film can be realized), but also sufficient rigidity can be imparted to the optical raw film by the reflective polarizing film to suppress fluttering or meandering at the time of the slitting process, thereby improving the slitting process accuracy. By virtue of their synergetic effect, when the first optical film and any other optical member (for example, a liquid crystal cell) in the manufacturing method of the present invention are laminated, accuracy (dimensional accuracy of the film) of cutting (including half-cutting) in an optical film width direction to be performed with reference to an edge side (slit surface) and bonding accuracy can be more easily obtained, and the axis direction and bonding position accuracy can be satisfactorily adjusted. As a result, there can be provided a liquid crystal display panel that is more excellent in display characteristics. It should be noted that the slitting process may be performed successively after the manufacture of the first optical film, or may be performed before the bonding of the first optical film onto the liquid crystal cell in a manufacturing line for a liquid crystal display panel. In other words, the first optical film may be provided in a state of having been slit, or may be provided in a state of not having been slit to be slit and bonded onto the liquid crystal cell successively.

A-9. Cutting Lines

As required, cutting lines may be formed in the first optical film. The cutting lines are formed in the width direction of the first optical film at a predetermined interval along its longitudinal direction. For example, when the width of the first optical film is set to a length corresponding to a pair of opposing sides (for example, in the vertical direction) of the liquid crystal cell, the cutting lines are formed along the longitudinal direction of the first optical film at an interval corresponding to the other pair of opposing sides (for example, in the horizontal direction) of the liquid crystal cell. In addition, for example, when the width of the first optical film is set to a length corresponding to sides in the horizontal direction of the liquid crystal cell, the cutting lines are formed along the longitudinal direction of the first optical film at an interval corresponding to sides in the vertical direction of the liquid crystal cell. The cutting lines are typically formed by cutting portions except for the release film 50, i.e., the surface protective film 60, the reflective polarizing film 40, the polarizing plate 10, and the pressure-sensitive adhesive layer 30.

B. Second Optical Film

B-1. Entire Construction of Second Optical Film

Figure 7:
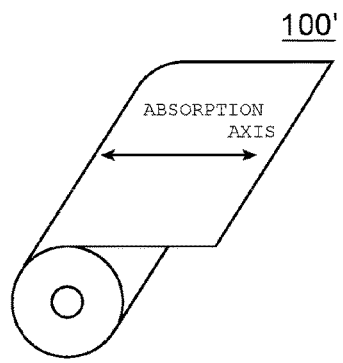
FIG. 7($a$) is a schematic perspective view of an example of a second optical film to be used in the manufacturing method of the present invention, and FIG. 7($b$) is a partially enlarged cross-sectional view of FIG. 7($a$).
Figure 7:
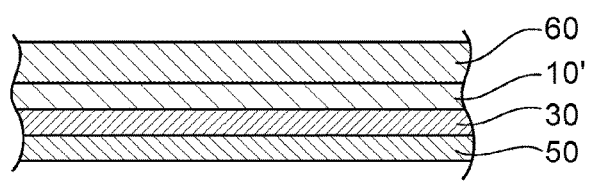

FIG. 7 are schematic views of an example of the second optical film to be used in the manufacturing method of the present invention. FIG. 7(*a*) is a perspective view, and FIG. 7(*b*) is a partially enlarged cross-sectional view of FIG. 7(*a*).

A second optical film 100' includes a polarizing plate 10'. The polarizing plate 10' includes a polarizing film, a first protective film arranged on one side of the polarizing film, and a second protective film arranged on the other side of the polarizing film (not shown). The second optical film 100' includes a pressure-sensitive adhesive layer 30 arranged on one side of the polarizing plate 10. As illustrated in the figures, in a practical case, a release film 50 is bonded onto the surface of the pressure-sensitive adhesive layer 30, and a surface protective film 60 is arranged as an outermost layer on the opposite side. The optical film may include any other film (layer) (not shown). It should be noted that the release film is peeled off when the second optical film is actually used, and hence the second optical film in the form of including the release film and the second optical film in the form of not including the release film are herein referred to as second optical film for the sake of convenience.

In the second optical film 100', the polarizing film of the polarizing plate 10' has an absorption axis in its lengthwise direction. In this context, the direction of the absorption axis of the polarizing film may encompass directions at from −5° to +5° counterclockwise with respect to the longitudinal direction of the optical film.

B-2. Polarizing Plate

The polarizing plate may adopt any appropriate construction as long as it has an absorption axis in the lengthwise direction of the polarizing film. The polarizing plate typically has a construction in which a protective film is arranged on at least one side of the polarizing film.

Any appropriate polarizing film may be adopted as the polarizing film. Examples thereof include: a polarizing film obtained by adsorbing a dichromatic substance such as iodine or a dichromatic dye to a hydrophilic polymer film such as a polyvinyl alcohol-based film, a partially formalized polyvinyl alcohol-based film, or an ethylene-vinyl acetate copolymer-based partially saponified film and uniaxially stretching the film; and a polyene-based orientation film such as a dehydration treatment product of polyvinyl alcohol or a dehydrochlorination treatment product of polyvinyl chloride. Of those, a polarizing film obtained by adsorbing a dichromatic substance such as iodine to a polyvinyl alcohol-based film and uniaxially stretching the film is particularly preferred because of its high polarized dichromaticity. The thickness of any such polarizing film is not particularly limited, but is generally from about 1 to 80 μm.

The polarizing film obtained by adsorbing iodine to a polyvinyl alcohol-based film and uniaxially stretching the film may be produced by, for example, dyeing polyvinyl alcohol through immersion in an aqueous solution of iodine, and stretching the resultant to 3 to 7 times the original length. As required, the aqueous solution may contain boric acid, zinc sulfate, zinc chloride, or the like, or the polyvinyl alcohol-based film may be immersed in an aqueous solution of potassium iodide or the like. Further, as required, the polyvinyl alcohol-based film may be subjected to water washing by being immersed in water before the dyeing.

When the polyvinyl alcohol-based film is subjected to water washing, fouling or a blocking preventing agent on the surface of the polyvinyl alcohol-based film can be washed off, and moreover, the polyvinyl alcohol-based film is swollen to provide a preventive effect on non-uniformity such as dyeing unevenness. The stretching may be performed after the dyeing with iodine, the stretching may be performed while the dyeing is performed, or the stretching may be performed before the dyeing with iodine. The stretching may be performed in an aqueous solution of boric acid, potassium iodide, or the like, or in a water bath.

Any appropriate protective film may be adopted as the protective film. For example, the film as described in the section A-2-3 may be used.

B-3. Slitting Process

The second optical film 100' is slit and rolled into a roll shape. As in the case of the first optical film, the width of the slit second optical film has a length corresponding to a pair of opposing sides of the liquid crystal cell. As in the case of the first optical film, the slitting process may be performed successively after the manufacture of the second optical film, or may be performed before the bonding of the second optical film onto the liquid crystal cell in a manufacturing line for a liquid crystal display panel. In other words, the second optical film may be provided in a state of having been slit, or may be provided in a state of not having been slit to be slit and bonded onto the liquid crystal cell successively.

B-4. Cutting Lines

As required, cutting lines may be formed in the second optical film. The cutting lines are typically formed by cutting portions except for the release film 50, i.e., the surface protective film 60, the polarizing plate 10', and the pressure-sensitive adhesive layer 30. Details of the cutting lines are as described in the section A-9 for the first optical film.

C. Feeding, Conveyance, and Cutting of First Optical Film

Figure 8:
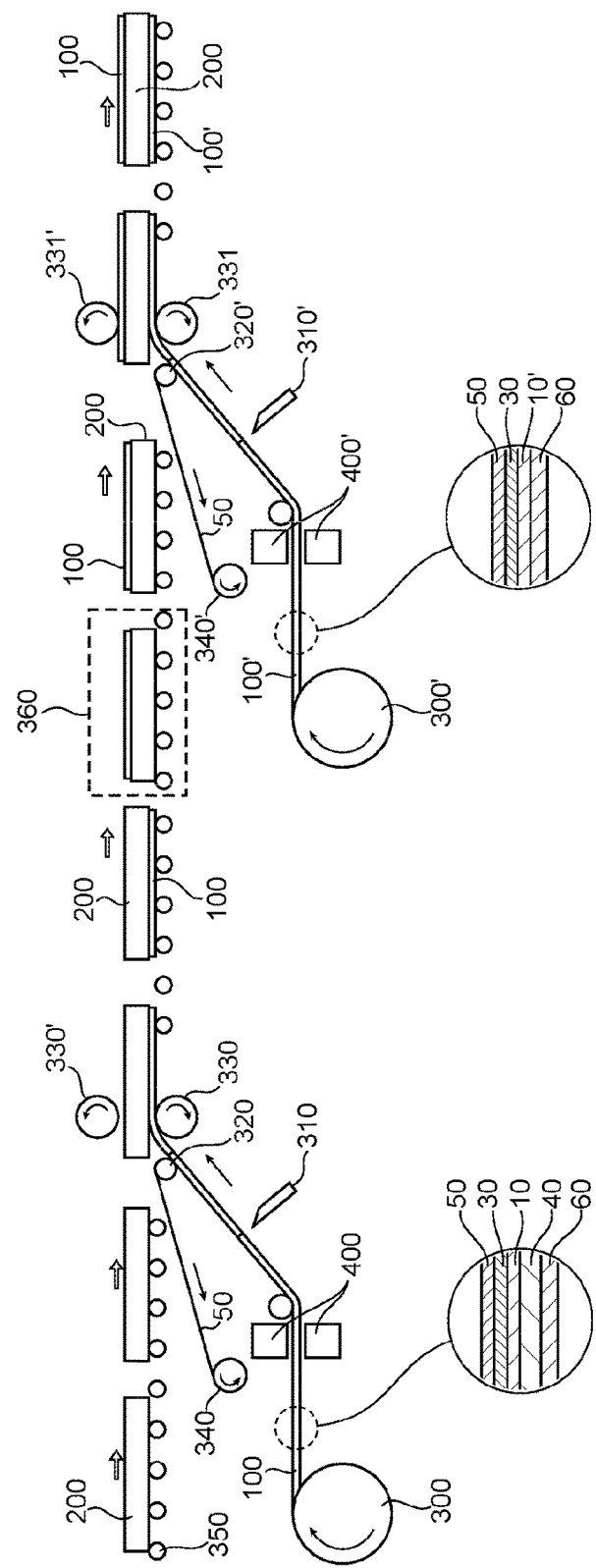
FIG. 8 is a schematic lateral view illustrating a manufacturing method for a liquid crystal display panel according to one embodiment of the present invention and a manufacturing apparatus to be used in the method.

As illustrated in FIG. 8, the first optical film 100 prepared as described in the section A is fed by a feed roll 300. As required, the fed first optical film 100 may be subjected to defect inspection with a defect inspection apparatus 400. Any appropriate method may be used as a method for the defect inspection. Specific examples thereof include: a method involving irradiating both surfaces of the first optical film 100 with light, and performing imaging/image processing with transmitted light or reflected light; a method involving arranging a polarizing film for inspection between the first optical film 100 and the defect inspection apparatus (substantially, a CCD camera in the apparatus) so that the absorption axis of the polarizing film may be perpendicular to the absorption axis of the polarizing plate 10 of the first optical film 100 (hereinafter sometimes referred to as 0-degree cross), followed by imaging/image processing; and a method involving arranging a polarizing film for inspection between the first optical film 100 and the defect inspection apparatus (substantially, a CCD camera in the apparatus) so that the absorption axis of the polarizing film may form a predetermined angle with the absorption axis of the polarizing plate 10 of the first optical film. 100 (for example, an angle within the range of from more than 0° to 10° or less) (hereinafter sometimes referred to as x-degree cross), followed by imaging/image processing. According to the imaging/image processing method based on transmitted light, foreign matter inside the first optical film 100 can be detected. According to the imaging/image processing method based on reflected light, adhered foreign matter on the surface of the first optical film 100 can be detected. According to the imaging/image processing method based on the 0-degree cross, adhered foreign matter and fouling on the surface of the first optical film 100, and foreign matter inside the first optical film 100 can be detected as bright spots. According to the imaging/image processing method based on the x-degree cross, a knick in the first optical film 100 can be mainly detected. Any appropriate method may be adopted for an algorithm for the image processing. For example, a defect can be detected by grayscale determination through binarization. Information obtained through the defect inspection (typically, positional information on a defect) is sent to a control apparatus, and the conveying speed of the first optical film 100, cutting thereof with the cutting apparatus 310 to be described later, and the like can be controlled on the basis of the information.

Next, as illustrated in FIG. 8, the first optical film 100 is cut with the cutting apparatus 310 while being conveyed. Any appropriate cutting means may be adopted as the cutting apparatus. Specific examples thereof include a laser apparatus and a cutter. In one embodiment, the width of the first optical film 100 is set to a length corresponding to a pair of opposing sides (for example, in the vertical direction) of the liquid crystal cell 200. In this case, the first optical film 100 is cut in its width direction so as to have a length corresponding to the other pair of opposing sides (for example, in the horizontal direction) of the liquid crystal cell 200. More specifically, the first optical film 100 can be cut so as to have a length corresponding to the other pair of opposing sides (for example, in the horizontal direction) of the liquid crystal cell 200 by controlling the conveying speed of the first optical film 100 and an interval of cutting operation through the use of the control apparatus. As described above, when a defect is found through any appropriate defect inspection, the conveying speed and the interval of cutting operation can be adjusted on the basis of information on the defect so that the first optical film 100 except for a portion in which the defect is present can be cut so as to have a length corresponding to the other pair of opposing sides (for example, in the horizontal direction) of the liquid crystal cell 200. In another embodiment, the width of the first optical film 100 is set to a length corresponding to a pair of opposing sides (for example, in the horizontal direction) of the liquid crystal cell 200. In this case, the first optical film 100 is cut in its width direction so as to have a length corresponding to the other pair of opposing sides (for example, in the vertical direction) of the liquid crystal cell 200. The cut length is controlled in the same manner as above. In any of the embodiments, portions of the first optical film 100 except for the release film 50, i.e., the surface protective film 60, the reflective polarizing film 40, the polarizing plate 10, and the pressure-sensitive adhesive layer 30 are typically cut (half-cutting). The cut first optical film 100 is conveyed to first bonding apparatus 330, 330' while being supported by the release film 50.

D. Bonding of First Optical Film onto Liquid Crystal Cell

While the first optical film 100 is fed, conveyed, subjected to any appropriate defect inspection, and cut, the liquid crystal cell 200 is conveyed by conveying means 350. The driving mode of the liquid crystal cell to be used in the present invention is not particularly limited, and is for example, a VA mode or an IPS mode. Examples of the conveying means 350 include: a roller conveyer configured to convey the liquid crystal cell in a horizontal direction on a plurality of arranged rollers; and a wheel conveyer configured to convey the liquid crystal cell in a horizontal direction on a plurality of arranged wheels. While the liquid crystal cell 200 is conveyed, its surface is washed and positioning is performed so that the optical film may be bonded onto an appropriate position. After that, the liquid crystal cell 200 is conveyed to the first bonding apparatus 330, 330'.

The liquid crystal cells 200 may be conveyed at a predetermined interval, or may be continuously conveyed. The first optical film 100 can be bonded onto a desired position on the liquid crystal cell irrespective of the mode of conveyance of the liquid crystal cell 200 by controlling the conveying speed of the first optical film 100, the operation of the cutting apparatus, and the like in accordance with the mode of conveyance of the liquid crystal cell 200. In the present invention, as described above, the directional relationship between the absorption axis and reflection axis of the polarizing film and reflective polarizing film bonded in advance in the first optical film 100 is precisely controlled, and hence an axis direction can be satisfactorily controlled merely by bonding such optical film onto a predetermined position on the liquid crystal cell. As a result, high manufacturing efficiency can be realized with the use of the polarizing plate having an absorption axis in its width direction, and a liquid crystal display panel having extremely excellent display characteristics can be obtained.

The release film 50 is separated from the first optical film 100 that has been cut and conveyed while being supported by the release film 50 immediately before the first bonding apparatus 330, 330' by release film-separating means 320. Examples of the release film-separating means 320 include a roller and a wedge member. The separated release film 50 is recovered by being rolled on a take-up roll 340.

Next, as illustrated in FIG. 8, in the first bonding apparatus 330, 330', the first optical film 100 from which the release film 50 has been separated is bonded onto one surface (in the illustrated example, a surface on the opposite side to the viewer side) of the liquid crystal cell 200 through the intermediation of the pressure-sensitive adhesive layer 30. The first optical film 100 can be bonded onto a desired position on the liquid crystal cell by positioning the liquid crystal cell 200 during its conveyance, and by controlling the conveying speeds of the first optical film 100 and the liquid crystal cell 200. For example, the first optical film 100 may be bonded onto the liquid crystal cell 200 so that: the edge surface (cut surface) of the first optical film 100 on a front end side in its machine direction may be parallel to the edge surface of the liquid crystal cell 200 on a front end side in its machine direction; and the edge surface of the first optical film may be positioned at a predetermined position (for example, 1 to 5 mm inside) with respect to the edge surface of the liquid crystal cell. In the bonding step, as described above, the directional relationship between the absorption axis and reflection axis of the polarizing film and reflective polarizing film bonded in advance in the first optical film 100 is precisely controlled, and hence an axis direction can be satisfactorily controlled merely by bonding such optical film onto a predetermined position on the liquid crystal cell. As a result, high manufacturing efficiency can be realized with the use of the polarizing plate having an absorption axis in its width direction, and a liquid crystal display panel having extremely excellent display characteristics can be obtained. Examples of the bonding apparatus 330, 330' include nip rollers.

E. Feeding, Conveyance, and Cutting of Second Optical Film

Meanwhile, as illustrated in FIG. 8, as in the case of the first optical film 100, the second optical film 100' prepared as described in the section B is, while being fed by a feed roll 300' and conveyed, subjected to any appropriate defect inspection with a defect inspection apparatus 400', and then cut with a cutting apparatus 310'. As in the case of the first optical film 100, the second optical film 100' is typically cut except for the release film 50. That is, portions of the second optical film 100' except for the release film 50, i.e., the surface protective film 60, the polarizing plate 10', and the pressure-sensitive adhesive layer 30 are cut (half-cutting). The cut second optical film 100' is conveyed to second bonding apparatus 331, 331' while being supported by the release film 50. The release film 50 is separated from the second optical film 100' immediately before the second bonding apparatus 331, 331' by release film-separating means 320'. The separated release film 50 is recovered by being rolled on a take-up roll 340'.

F. Bonding of Second Optical Film onto Liquid Crystal Cell

As illustrated in FIG. 8, the liquid crystal cell 200 having bonded thereonto the first optical film 100 is inverted upside down with any appropriate inverting mechanism 360 and conveyed to the second bonding apparatus 331, 331'. Examples of the inverting mechanism 360 include: a system configured to invert the liquid crystal cell through adsorption; and a system configured to invert the liquid crystal cell by sandwiching the liquid crystal cell between supports. In the second bonding apparatus 331, 331', the second optical film 100' from which the release film 50 has been separated is bonded onto a surface of the liquid crystal cell 200 not having bonded thereonto the first optical film (in the illustrated example, a surface on the viewer side) through the intermediation of the pressure-sensitive adhesive layer 30. As in the case of the bonding of the first optical film, the second optical film 100' can be bonded onto a desired position on the liquid crystal cell by positioning the liquid crystal cell 200 during its conveyance, and by controlling the conveying speeds of the second optical film 100' and the liquid crystal cell 200. For example, the second optical film 100' may be bonded onto the liquid crystal cell 200 so that: the edge surface (cut surface) of the second optical film 100' on a front end side in its machine direction may be parallel to the edge surface of the liquid crystal cell 200 on a front end side in its machine direction; and the edge surface of the second optical film may be positioned at a predetermined position (for example, 1 to 5 mm inside) with respect to the edge surface of the liquid crystal cell. Thus, a liquid crystal display panel can be produced.

It should be noted that, in the illustrated example, an embodiment in which the second optical film 100' is bonded after the bonding of the first optical film 100 is illustrated. However, the first optical film 100 may be bonded after the bonding of the second optical film 100', or the first optical film 100 and the second optical film 100' may be simultaneously bonded onto both surfaces of the liquid crystal cell.

G. Another Embodiment

Figure 9:
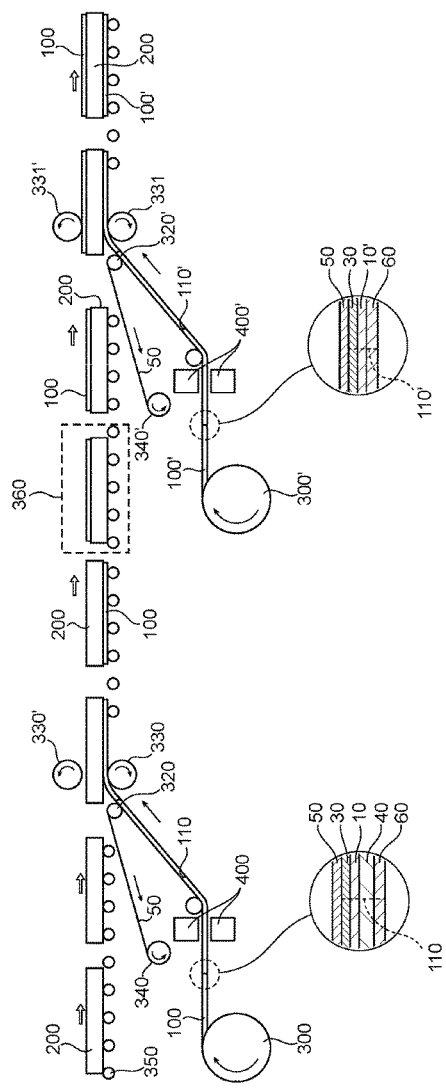
FIG. 9 is a schematic lateral view illustrating a manufacturing method for a liquid crystal display panel according to another embodiment of the present invention and a manufacturing apparatus to be used in the method.

FIG. 9 is a schematic lateral view illustrating a manufacturing method for a liquid crystal display panel according to another embodiment of the present invention. In this embodiment, as described in the section A-9, cutting lines are formed in the first optical film 100 in its width direction along its longitudinal direction at a predetermined interval. For example, when the width of the first optical film 100 is set to a length corresponding to a pair of opposing sides (for example, in the vertical direction) of the liquid crystal cell 200, cutting lines 110 are formed along the longitudinal direction of the first optical film 100 at an interval corresponding to the other pair of opposing sides (for example, in the horizontal direction) of the liquid crystal cell. In addition, for example, when the width of the first optical film 100 is set to a length corresponding to a pair of opposing sides (for example, in the horizontal direction) of the liquid crystal cell 200, the cutting lines 110 are formed along the longitudinal direction of the first optical film 100 at an interval corresponding to the other pair of opposing sides (for example, in the vertical direction) of the liquid crystal cell. The cutting lines 110 are typically formed by cutting portions except for the release film 50, i.e., the surface protective film 60, the reflective polarizing film 40, the polarizing plate 10, and the pressure-sensitive adhesive layer 30. Similarly, cutting lines 110' are formed in the second optical film 100'. An interval at which the cutting lines 110' are formed is the same as in the case of the first optical film 100. The cutting line 110' are typically formed by cutting portions except for the release film 50, i.e., the surface protective film 60, the polarizing plate 10, and the pressure-sensitive adhesive layer 30. That is, each of the first optical film 100 and the second optical film 100' is divided in advance so as to have a size and shape corresponding to the size and shape of the liquid crystal cell and is provided in the form of being supported on the release film 50, 50. As a result, as illustrated in FIG. 9, the cutting step may be omitted in this embodiment.

Figure 10:
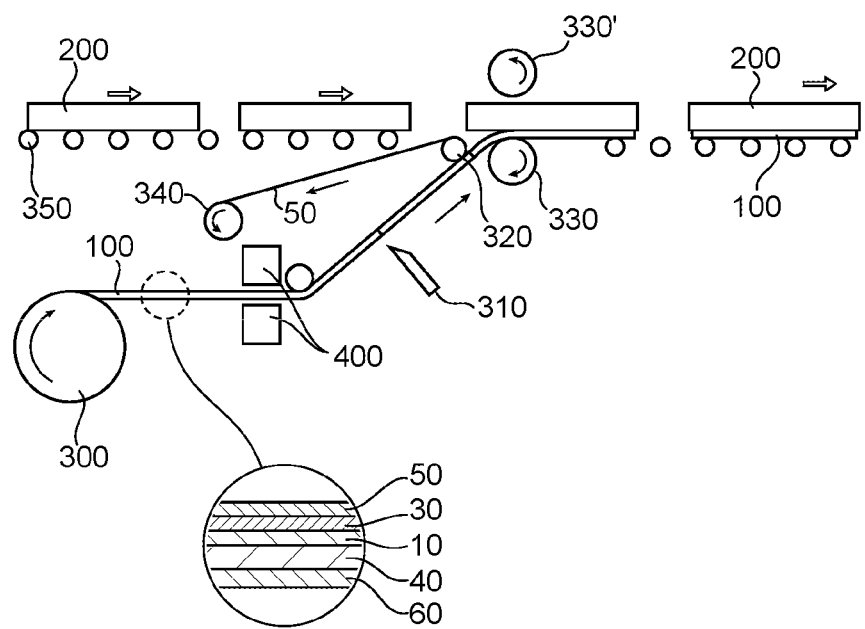
FIG. 10 is a schematic lateral view illustrating a manufacturing method for a liquid crystal display panel according to still another embodiment of the present invention and a manufacturing apparatus to be used in the method.
Figure 11:
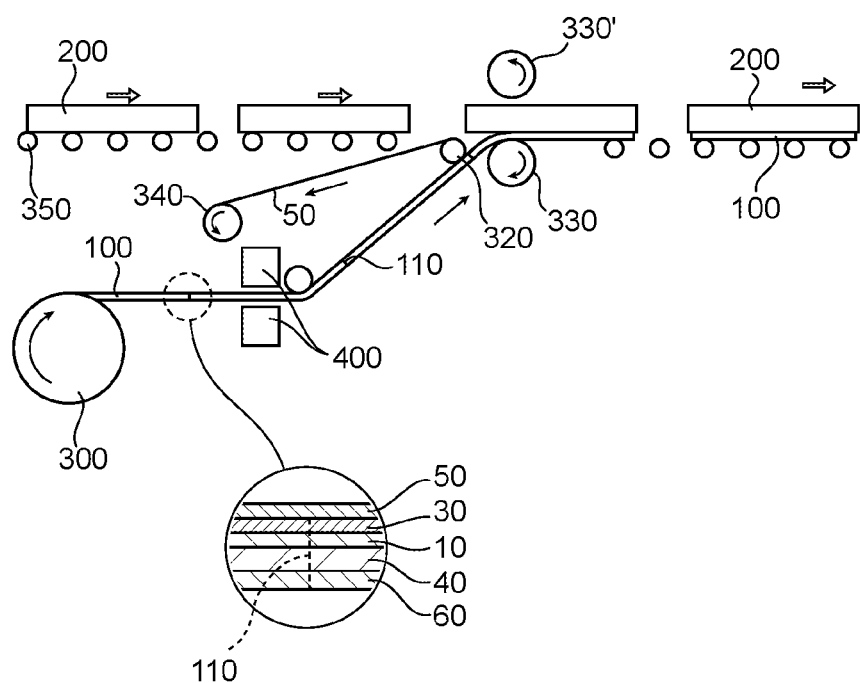
FIG. 11 is a schematic lateral view illustrating a manufacturing method for a liquid crystal display panel according to still another embodiment of the present invention and a manufacturing apparatus to be used in the method.

FIG. 10 and FIG. 11 are each a schematic lateral view illustrating a manufacturing method for a liquid crystal display panel according to still another embodiment of the present invention. These embodiments are substantially ones in which only the first optical film 100 is bonded onto the liquid crystal cell 200 by RTP in the manufacturing method for a liquid crystal display panel described in the section C to the section G. The embodiment illustrated in FIG. 10 corresponds to the section C and section D, in which description was made with reference to FIG. 8, and the embodiment illustrated in FIG. 11 corresponds to the section G, in which description was made with reference to FIG. 9. Accordingly, detailed description thereof is omitted. It should be noted that, in each of the illustrated examples, an embodiment in which the first optical film 100 is bonded by RTP onto the liquid crystal cell 200 not having bonded thereonto another optical film (typically an optical film including a polarizing film) is illustrated. However, it should be appreciated that the first optical film 100 may be bonded by RTP onto a surface of the liquid crystal cell 200 having bonded thereonto another optical film on the opposite side to a surface having bonded thereonto the another optical film. That is, in the manufacturing method for a liquid crystal display panel of the present invention, the first optical film may be bonded by RTP onto a surface of a liquid crystal cell having another optical film bonded onto one side thereof on the opposite side to a surface having bonded thereonto the another optical film, to thereby produce the liquid crystal display panel; or the first optical film may be bonded by RTP onto a liquid crystal cell having bonded thereonto no optical film, followed by the bonding of another optical film onto a surface of the liquid crystal cell on the opposite side to a surface having bonded thereonto the first optical film at any appropriate timing depending on purposes. Regarding the bonding of another optical film, a film corresponding to the second optical film 100' described in the section C to the section G may be bonded by RTP, any appropriate optical film including a polarizing film may be bonded by RTP, or any appropriate optical film including a polarizing film may be cut and bonded piece by piece.

II. Manufacturing Apparatus

According to another embodiment of the present invention, there is provided an apparatus for manufacturing a liquid crystal display panel. The construction of the apparatus for manufacturing a liquid crystal display panel according to this embodiment is as described for the manufacturing method for a liquid crystal display panel with reference to FIG. 8 to FIG. 11, and hence is described supplementarily in this section. In an embodiment corresponding to FIG. 8, the manufacturing apparatus includes: a cell-conveying unit for conveying the liquid crystal cell 200 (in the illustrated example, the conveying means 350); a first optical film-supplying unit for supplying the first optical film 100 (in the illustrated example, the feed roll 300); a first cutting unit for cutting the first optical film in its width direction (in the illustrated example, the cutting apparatus 310); a second optical film-supplying unit for supplying the second optical film 100' (in the illustrated example, the feed roll 300'); a second cutting unit for cutting the second optical film in its width direction (in the illustrated example, the cutting apparatus 310'); a first bonding unit for bonding the cut first optical film onto one surface of the liquid crystal cell 200 (in the illustrated example, the first bonding apparatus 330, 330'); and a second bonding unit for bonding the cut second optical film to the other surface of the liquid crystal cell (in the illustrated example, the second bonding apparatus 331, 331'). In the conveying unit, any appropriate inverting mechanism 360 for inverting the liquid crystal cell upside down is provided between the first bonding unit and the second bonding unit. In an embodiment corresponding to FIG. 9, the first cutting unit and the second cutting unit may be omitted. In embodiments corresponding to FIG. 10 and FIG. 11, the inverting mechanism, the second optical film-supplying unit, the second cutting unit, and the second bonding unit may be omitted.

Figure 12:
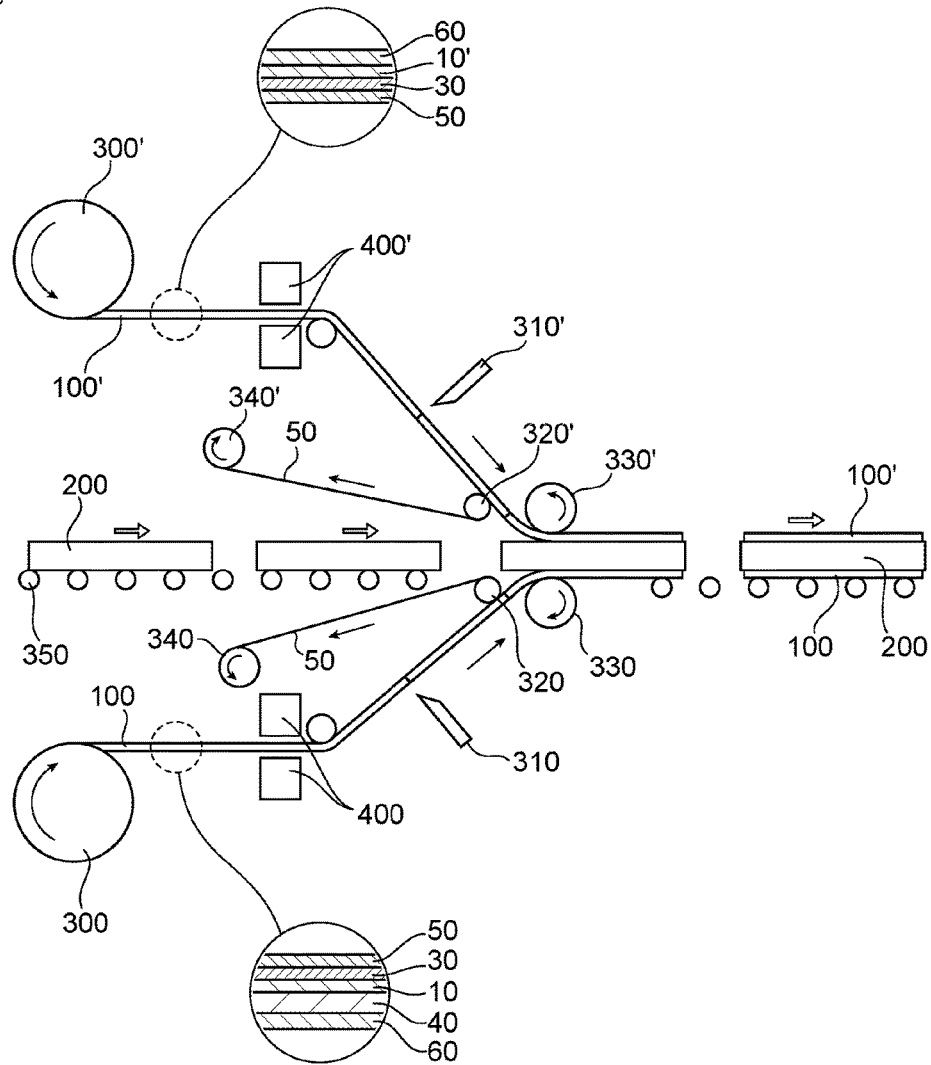
FIG. 12 is a schematic lateral view illustrating a manufacturing method for a liquid crystal display panel according to still another embodiment of the present invention and a manufacturing apparatus to be used in the method.

In the embodiments illustrated in FIG. 8 and FIG. 9, the case where the first optical film 100 and the second optical film 100' are sequentially bonded was described. In the present invention, however, the first optical film 100 and the second optical film 100' may be simultaneously bonded onto the liquid crystal cell. In this case, for example, as illustrated in FIG. 12 and FIG. 13, the first optical film 100 and the second optical film 100' may be supplied from below and above the conveyed liquid crystal cell 200, respectively. As in the case of the embodiments of FIG. 8 and FIG. 9, the first optical film and the second optical film can be simultaneously bonded onto desired positions on the liquid crystal cell by positioning the liquid crystal cell 200 during its conveyance, and by controlling the conveying speeds of the first optical film 100, the second optical film 100', and the liquid crystal cell 200. Embodiments of FIG. 12 and FIG. 13 may adopt basically the same constructions as those of the embodiments of FIG. 8 and FIG. 9 except for a difference in positions at which the first optical film and the second optical film are supplied, and hence detailed description thereof is omitted.

While specific embodiments of the present invention have been described above, it is apparent to a person skilled in the art that various modifications may be made without departing from the technical concept of the present invention. The present invention encompasses all such modifications. Further, it should be appreciated that the specific embodiments may be appropriately combined with modified embodiments obvious to a person skilled in the art, description of which is omitted.

INDUSTRIAL APPLICABILITY

The manufacturing method of the present invention enables the manufacture of a liquid crystal display panel having excellent display characteristics with extremely high manufacturing efficiency using a simple manufacturing apparatus, and hence is extremely useful in industry. The liquid crystal display panel obtained by the manufacturing method of the present invention can be used in various applications including: portable equipment such as a personal digital assistant (PDA), a mobile phone, a timepiece, a digital camera, and a portable game console; OA equipment such as a personal computer monitor, a laptop computer, and a copying machine; domestic electrical equipment such as a video camera, a liquid crystal television, and a microwave oven; in-car equipment such as a rear view monitor, a monitor for a car navigation system, and a car audio system; display equipment such as an information monitor for a commercial store; security equipment such as a surveillance monitor; and nursing care/medical equipment such as a nursing care monitor and a medical monitor.

REFERENCE SIGNS LIST 10, 10' polarizing plate
11 polarizing film
30 pressure-sensitive adhesive layer
40 reflective polarizing film
50 release film
60 surface protective film
100 first optical film
100' second optical film
200 liquid crystal cell

The invention claimed is:

1. A manufacturing method for a liquid crystal display panel including a liquid crystal cell and optical films arranged on both sides of the liquid crystal cell, the manufacturing method comprising the steps of:

cutting, while feeding a first optical film from an optical film roll, the optical film roll being obtained by slitting the first optical film having an elongate shape, which includes a reflective polarizing film having a reflection axis in its width direction and a polarizing film having an absorption axis in its width direction, so as to have a width corresponding to a pair of opposing sides of the liquid crystal cell, and by rolling the slit first optical film, the first optical film in its width direction so as to have a length corresponding to another pair of opposing sides of the liquid crystal cell;

cutting, while feeding a second optical film from an optical film roll, the optical film roll being obtained by slitting the second optical film having an elongate shape, which includes a polarizing film having an absorption axis in its longitudinal direction, so as to have a width corresponding to a pair of opposing sides of the liquid crystal cell, and by rolling the slit second optical film, the second optical film in its width direction so as to have a length corresponding to another pair of opposing sides of the liquid crystal cell;

bonding the cut first optical film onto one surface of the liquid crystal cell; and bonding the cut second optical film onto another surface of the liquid crystal cell.

2. A manufacturing method for a liquid crystal display panel according to claim 1, wherein the polarizing film of the first optical film has a thickness of less than 10 μm.

3. A manufacturing method for a liquid crystal display panel according to claim 1, wherein the bonding comprises bonding one of the cut first optical film and the cut second optical film onto the one surface of the liquid crystal cell, and then bonding another of the cut first optical film and the cut second optical film onto the another surface of the liquid crystal cell.

4. A manufacturing method for a liquid crystal display panel according to claim 1, wherein the width of the first optical film and the width of the second optical film each correspond to a short side of the liquid crystal cell, and wherein the length of the cut first optical film and the length of the cut second optical film each correspond to a long side of the liquid crystal cell.

5. A manufacturing method for a liquid crystal display panel according to claim 1, wherein the width of the first optical film and the width of the second optical film each correspond to a long side of the liquid crystal cell, and wherein the length of the cut first optical film and the length of the cut second optical film each correspond to a short side of the liquid crystal cell.

6. A manufacturing method for a liquid crystal display panel according to claim 1, wherein the bonding comprises bonding the cut first optical film onto a surface of the liquid crystal cell on an opposite side to a viewer side.

7. A manufacturing method for a liquid crystal display panel according to claim 1, wherein the first optical film includes the reflective polarizing film, the polarizing film, a pressure-sensitive adhesive layer, and a release film in the stated order, and wherein the cutting comprises cutting the first optical film except for the release film.

8. A manufacturing method for a liquid crystal display panel including a liquid crystal cell and optical films arranged on both sides of the liquid crystal cell, the manufacturing method comprising the steps of:

bonding, while feeding a first optical film from an optical film roll, the optical film roll being obtained by slitting the first optical film having an elongate shape, which includes a reflective polarizing film having a reflection axis in its width direction, a polarizing film having an absorption axis in its width direction, a pressure-sensitive adhesive layer, and a release film in the stated order, so as to have a width corresponding to a pair of opposing sides of the liquid crystal cell, forming cutting portions in a width direction of the first optical film except for the release film at an interval corresponding to another pair of opposing sides of the liquid crystal cell, and by rolling the first optical film, the first optical film onto one surface of the liquid crystal cell by peeling off the release film at each of the cutting portions; and bonding, while feeding a second optical film from an optical film roll, the optical film roll being obtained by slitting the second optical film having an elongate shape, which includes a polarizing film having an absorption axis in its longitudinal direction, a pressure-sensitive adhesive layer, and a release film in the stated order, so as to have a width corresponding to a pair of opposing sides of the liquid crystal cell, forming cutting portions in a width direction of the second optical film except for the release film at an interval corresponding to another pair of opposing sides of the liquid crystal cell, and by rolling the second optical film, the second optical film onto another surface of the liquid crystal cell by peeling off the release film at each of the cutting portions.

9. A manufacturing method for a liquid crystal display panel including a liquid crystal cell and an optical film arranged on at least one side of the liquid crystal cell, the manufacturing method comprising the steps of:

cutting, while feeding the optical film from an optical film roll, the optical film roll being obtained by slitting the optical film having an elongate shape, which includes a reflective polarizing film having a reflection axis in its width direction and a polarizing film having an absorption axis in its width direction, so as to have a width corresponding to a pair of opposing sides of the liquid crystal cell, and by rolling the slit optical film, the optical film in its width direction so as to have a length corresponding to another pair of opposing sides of the liquid crystal cell; and bonding the cut optical film onto one surface of the liquid crystal cell.

10. A manufacturing method for a liquid crystal display panel including a liquid crystal cell and an optical film arranged on at least one side of the liquid crystal cell, the manufacturing method comprising bonding, while feeding the optical film from an optical film roll, the optical film roll being obtained by slitting the optical film having an elongate shape, which includes a reflective polarizing film having a reflection axis in its width direction, a polarizing film having an absorption axis in its width direction, a pressure-sensitive adhesive layer, and a release film in the stated order, so as to have a width corresponding to a pair of opposing sides of the liquid crystal cell, forming cutting portions in a width direction of the optical film except for the release film at an interval corresponding to another pair of opposing sides of the liquid crystal cell, and by rolling the optical film, the optical film onto one surface of the liquid crystal cell by peeling off the release film at each of the cutting portions.

11. A manufacturing method for a liquid crystal display panel according to claim 9, further comprising bonding, after the bonding the cut optical film onto the one surface of the liquid crystal cell, another optical film including a polarizing film onto another surface of the liquid crystal cell.

12. A manufacturing method for a liquid crystal display panel according to claim 9, wherein a surface of the liquid crystal cell on an opposite side to the one surface, onto which the cut optical film is to be bonded, has bonded thereonto another optical film including a polarizing film.

13. A manufacturing method for a liquid crystal display panel according to claim 1, wherein the liquid crystal cell comprises a liquid crystal cell of a VA mode or a liquid crystal cell of an IPS mode.

* * * * *